United States Patent
Yoshikaie

(10) Patent No.: US 11,231,586 B2
(45) Date of Patent: Jan. 25, 2022

(54) OPTICAL APPARATUS, IMAGE DISPLAY APPARATUS, AND DISPLAY APPARATUS

(71) Applicant: SONY CORPORATION, Tokyo (JP)

(72) Inventor: Akira Yoshikaie, Tokyo (JP)

(73) Assignee: SONY CORPORATION, Tokyo (JP)

( * ) Notice: Subject to any disclaimer, the term of this patent is extended or adjusted under 35 U.S.C. 154(b) by 229 days.

(21) Appl. No.: 16/606,330

(22) PCT Filed: Mar. 16, 2018

(86) PCT No.: PCT/JP2018/010405
§ 371 (c)(1),
(2) Date: Oct. 18, 2019

(87) PCT Pub. No.: WO2018/198587
PCT Pub. Date: Nov. 1, 2018

(65) Prior Publication Data
US 2020/0057307 A1 Feb. 20, 2020

(30) Foreign Application Priority Data
Apr. 28, 2017 (JP) .............................. JP2017-089164

(51) Int. Cl.
*G02B 27/01* (2006.01)
*F21V 8/00* (2006.01)

(52) U.S. Cl.
CPC ......... *G02B 27/0172* (2013.01); *G02B 6/005* (2013.01); *G02B 6/0026* (2013.01);
(Continued)

(58) Field of Classification Search
CPC .. G02B 27/0172; G02B 6/0026; G02B 6/005; G02B 2027/0174; G02B 2027/0178
(Continued)

(56) References Cited

U.S. PATENT DOCUMENTS 5,347,400 A   9/1994 Hunter
6,580,529 B1  6/2003 Amitai et al.
(Continued)

FOREIGN PATENT DOCUMENTS

CN    1463369 A    12/2003
CN    101147094 A   3/2008
(Continued)

OTHER PUBLICATIONS

Office Action for CN Patent Application No. 201880026347.X, dated Feb. 2, 2021, 14 pages of Office Action and 13 pages of English Translation.
(Continued)

*Primary Examiner* — Collin X Beatty
(74) *Attorney, Agent, or Firm* — Chip Law Group

(57) ABSTRACT

An optical apparatus into which light emitted from an image forming apparatus enters, in which the light is guided, and from which the light is emitted includes a light guide plate 30, first deflection means 41, second deflection means 42, and third deflection means 43. The first deflection means 41 deflects light incident on the light guide plate 30 in such a manner that the light is totally reflected in the light guide plate 30. The second deflection means 42 deflects the light that has propagated in the light guide plate 30 by total reflection in such a manner as to cause the light to be emitted from the light guide plate 30. The third deflection means 43 deflects the light that has been deflected by the first deflection means 41 and that has propagated in the light guide plate 30 by total reflection toward the second deflection means 42. An incident angle of the light emitted from a center point of an image forming region of the image forming apparatus on the light guide plate is an angle other than zero degrees, and a unit vector of light emitted from the center point of the image forming region of the image
(Continued)

forming apparatus and a unit vector of this light at the time of emission from the light guide plate are opposite in direction.

15 Claims, 17 Drawing Sheets

(52) U.S. Cl.
CPC ............... *G02B 2027/0174* (2013.01); *G02B 2027/0178* (2013.01)

(58) Field of Classification Search
USPC .......................................................... 359/13
See application file for complete search history.

(56) References Cited

U.S. PATENT DOCUMENTS

| | | | |
|---|---|---|---|
| 9,827,209 B2* | 11/2017 | Kostamo | ............ G01N 33/6896 |
| 2006/0132914 A1 | 6/2006 | Weiss et al. | |
| 2009/0303599 A1 | 12/2009 | Levola | |
| 2010/0321781 A1 | 12/2010 | Levola et al. | |
| 2014/0140653 A1 | 5/2014 | Brown et al. | |
| 2014/0330966 A1 | 11/2014 | Marton et al. | |
| 2015/0062715 A1 | 3/2015 | Yamada et al. | |

FOREIGN PATENT DOCUMENTS

| | | | |
|---|---|---|---|
| CN | 101228483 | A | 7/2008 |
| CN | 101589326 | A | 11/2009 |
| CN | 102033319 | A | 4/2011 |
| CN | 103309035 | A | 9/2013 |
| CN | 103562802 | A | 2/2014 |
| CN | 103823267 | A | 5/2014 |
| CN | 103885184 | A | 6/2014 |
| CN | 104423042 | A | 3/2015 |
| CN | 204287680 | U | 4/2015 |
| CN | 104714361 | A | 6/2015 |
| CN | 104777614 | A | 7/2015 |
| CN | 106291926 | A | 1/2017 |
| CN | 106338832 | A | 1/2017 |
| CN | 106353885 | A | 1/2017 |
| CN | 106501938 | A | 3/2017 |
| CN | 106575034 | A | 4/2017 |
| EP | 2733517 | A1 | 5/2014 |
| JP | 10-319240 | A | 12/1998 |
| JP | 2008-546020 | A | 12/2008 |
| JP | 2009-133998 | A | 6/2009 |
| JP | 2014-132328 | A | 7/2014 |
| JP | 2015-049278 | A | 3/2015 |
| JP | 2016-212147 | A | 12/2016 |
| WO | 2006/132614 | A1 | 12/2006 |
| WO | 2008/081070 | A1 | 7/2008 |
| WO | 2016/174843 | A1 | 11/2016 |
| WO | 2017/062167 | A1 | 4/2017 |

OTHER PUBLICATIONS

Xiangbo, et al., "Lightweight Design of a Helmet-Mounted Display Optical System", Acta Optica Sinica, vol. 35, No. 10, Oct. 2015, 08 pages. (Translation of Abstract Only).

International Search Report and Written Opinion of PCT Application No. PCT/JP2018/010405, dated Jun. 12, 2018, 08 pages of ISRWO.

Office Action for CN Patent Application No. 201880026347.X, dated Jul. 27, 2021, 13 pages of Office Action and 14 pages of English Translation.

* cited by examiner

FIG. 17A
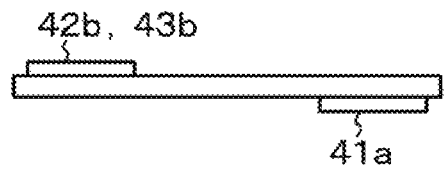
FIG. 17B
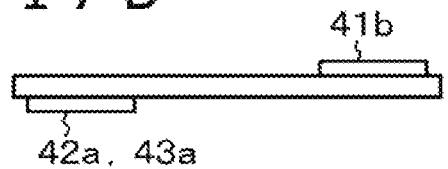
FIG. 17C
FIG. 17D
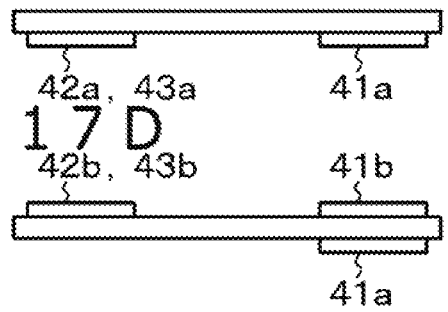
FIG. 17E
FIG. 17F
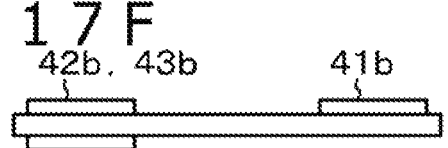
FIG. 17G
FIG. 17H

OPTICAL APPARATUS, IMAGE DISPLAY APPARATUS, AND DISPLAY APPARATUS

CROSS REFERENCE TO RELATED APPLICATIONS

This application is a U.S. National Phase of International Patent Application No. PCT/JP2018/010405 filed on Mar. 16, 2018, which claims priority benefit of Japanese Patent Application No. JP 2017-089164 filed in the Japan Patent Office on Apr. 28, 2017. Each of the above-referenced applications is hereby incorporated herein by reference in its entirety.

TECHNICAL FIELD

The present disclosure relates to an optical apparatus, an image display apparatus including the optical apparatus, and a display apparatus including the image display apparatus, and more specifically to a display apparatus used as a head-mounted display (HMD).

BACKGROUND ART

Recent years have seen earnest efforts being made in developing a head-mounted display (HMD) for displaying images from image forming apparatuses on optical apparatuses arranged in front of observer's eyes. Then, while various types of head-mounted displays are under study, there is a strong demand to increase a view angle of a display image so as to provide even more realistic images. In order to address such a demand, a head-mounted display having three deflection means on a light guide plate included in an optical apparatus is known, for example, from US Published Application No. 2006/0132914A1 or US Published Application No. 2014/0330966A1.

Also, Japanese Patent Laid-Open No. 2009-133998 discloses an image display apparatus, the image display apparatus including:

(A) an image forming apparatus having a plurality of pixels arranged in a two-dimensional matrix pattern;

(B) a collimating optics transforming light emitted from the pixels of the image forming apparatus into parallel light beams; and (C) an optical apparatus receiving, guiding, and emitting the plurality of parallel light beams traveling in different directions transformed by the collimating optics, the optical apparatus includes (a) a light guide plate emitting incident light after propagation therein by total reflection, (b) a first diffraction grating member disposed on the light guide plate, including a reflective volume holographic diffraction grating, and diffracting and reflecting the light entering into the light guide plate in such a manner that the incident light is totally reflected in the light guide plate, and (c) a second diffraction grating member including a reflective volume holographic diffraction grating, disposed on the light guide plate, diffracting and reflecting the light that has propagated in the light guide plate by total reflection, and emitting the light from the light guide plate, in which When a normal line of the first diffraction grating member that has its origin at a center of the first diffraction grating member, that passes through the center thereof, and whose positive direction is toward a side of the collimating optics, is denoted as an $X_i$ axis and an axial line of the light guide plate that passes through the origin, that is orthogonal to the $X_i$ axis, and whose positive direction is toward a side of the second diffraction grating member is denoted as a $Y_i$ axis, a central light beam that is emitted from a pixel at the center of the image forming apparatus and that passes through the center of the collimating optics is optically parallel to an $X_iY_i$ plane and intersects an $X_iZ_i$ plane at an acute angle.

CITATION LIST

Patent Literature

[PTL 1]
US Published Application No. 2006/0132914A1
[PTL 2]
US Published Application No. 2014/0330966A1
[PTL 3]
Japanese Patent Laid-Open No. 2009-133998

SUMMARY

Technical Problems

In the head-mounted displays disclosed in the above two US Published applications, however, light emitted from the center point of the image forming region of the image forming apparatus is perpendicularly incident on deflection means, and this makes it impossible to address the demand to further increase the view angle of the display image. Also, the image display apparatus disclosed in the Japanese Patent Laid-Open No. 2009-133998 has only two diffraction grating members, the first and second diffraction grating members, and this makes it impossible to increase the display image region only in one direction from the first diffraction grating member to the second diffraction grating member in the light guide plate. However, if three diffraction grating members are provided, it is possible to increase the display image region in two directions in the light guide plate.

Therefore, it is an object of the present disclosure to provide an optical apparatus configured and structured to permit further increase in the view angle of the display image, an image display apparatus including the optical apparatus, and an image display apparatus including the image display apparatus.

Solution to Problems

An optical apparatus according to a first embodiment of the present disclosure for achieving the above object is an optical apparatus into which light emitted from an image forming apparatus enters, in which the light is guided, and from which the light is emitted. The optical apparatus includes a light guide plate and first, second, and third deflection means. The incident light propagates in the light guide plate by total reflection and then is emitted therefrom. The first deflection means deflects the light entering into the light guide plate in such a manner that the light is totally reflected in the light guide plate. Second deflection means deflects the light that has propagated in the light guide plate by total reflection in such a manner as to cause the light to be emitted from the light guide plate. Third deflection means deflects the light that has been deflected by the first deflection means and that has propagated in the light guide plate by total reflection toward the second deflection means.

First and second coordinate systems are assumed. In the first coordinate system, a point where a normal line of the light guide plate passing through a center point of the first deflection means intersects the light guide plate is denoted as a first origin $O_{in}$, a normal line of the light guide plate passing through the first origin $O_{in}$ and extending toward a side where light is emitted from the light guide plate is denoted as a $-Z_{in}$ axis, and an axis parallel to a traveling direction of the light that is deflected by the first deflection means 41 and propagates in the light guide plate by total reflection and passing through the first origin $O_{in}$ is denoted as a $+Y_{in}$ axis. In the second coordinate system, a point where a central incident light beam, a light beam emitted from the center point of an image forming region of the image forming apparatus and passing through the first origin $O_{in}$, is emitted from the light guide plate, is denoted as a second origin $O_{out}$, a normal line of the light guide plate passing through the second origin $O_{out}$ and extending toward the side where light is emitted from the light guide plate is denoted as a $-Z_{out}$ axis, and an axis parallel to the $+Y_{in}$ axis and passing through the second origin $O_{out}$ is denoted as a $+Y_{out}$ axis.

At this time, a central outgoing light beam, a light beam at the time of emission of the central incident light beam from the light guide plate, intersects an $X_{out}Y_{out}$ plane at an angle different from zero degrees, or intersects an $X_{out}Z_{out}$ plane at an angle different from zero degrees, or intersects the $X_{out}Y_{out}$ plane at an angle different from zero degrees and intersects the $X_{out}Z_{out}$ plane at an angle different from zero degrees. It should be noted that the term "total reflection" refers to internal total reflection or total reflection in the light guide plate.

An optical apparatus according to a second embodiment of the present disclosure for achieving the above object is an optical apparatus into which light emitted from an image forming apparatus enters, in which the light is guided, and from which the light is emitted. The optical apparatus includes a light guide plate and first, second, and third deflection means. The incident light propagates in the light guide plate by total reflection and then is emitted therefrom. First deflection means deflects the light entering into the light guide plate in such a manner that the light is totally reflected in the light guide plate. Second deflection means deflects the light that has propagated in the light guide plate by total reflection in such a manner as to cause the light to be emitted from the light guide plate. Third deflection means deflects the light that has been deflected by the first deflection means and that has propagated in the light guide plate by total reflection toward the second deflection means.

An incident angle of a central incident light beam, a light beam emitted from the center point of an image forming region of the image forming apparatus on the light guide plate, is an angle other than zero degrees (angle different from zero degrees), and a unit vector of the central incident light beam and a unit vector of a central outgoing light beam, a light beam at the time of emission of the central incident light beam from the light guide plate, are identical in magnitude.

That is, in the optical apparatus according to the second embodiment of the present disclosure, for example, when the unit vector of the central incident light beam is represented by $Uv^V(x^V_{in\text{-}unit}, y^V_{in\text{-}unit}, z^V_{in\text{-}unit})$ with respect to the first coordinate system of the optical apparatus according to the first embodiment of the present disclosure and the unit vector of the central outgoing light beam is represented by $Uv(x^V_{out\text{-}unit}, y^V_{out\text{-}unit}, z^V_{out\text{-}unit})$ with respect to the second coordinate system.

$$x^V_{in\text{-}unit} = x^V_{out\text{-}unit}$$

$$y^V_{in\text{-}unit} = y^V_{out\text{-}unit}$$

Then, when the first and second coordinate systems are used as references, and in a case where the central incident light beam enters into the optical apparatus from a first, second, third, or fourth quadrant and is emitted from a fifth, sixth, seventh, or eighth quadrant, $$z^V_{in\text{-}unit} = z^V_{out\text{-}unit}$$

and, in a case where the central incident light beam enters into the optical apparatus from the fifth, sixth, seventh, or eighth quadrant and the central outgoing light beam is emitted from the fifth, sixth, seventh, or eighth quadrant:

$$z^V_{in\text{-}unit} = -z^V_{out\text{-}unit}$$

It should be noted that vector components are represented by adding a superscript "v."

An image display apparatus of the first or second embodiment of the present disclosure for achieving the above object includes an image forming apparatus and an optical apparatus. Light emitted from the image forming apparatus enters into the optical apparatus, is guided therein, and is emitted therefrom.

The optical apparatus includes the optical apparatus according to the first or second embodiment of the present disclosure.

A display apparatus of the first or second embodiment of the present disclosure for achieving the above object includes a frame and an image display apparatus. The frame is worn on an observer's head. The image display apparatus is attached to the frame.

The image display apparatus includes an image forming apparatus and an optical apparatus. Light emitted from the image forming apparatus enters the optical apparatus, is guided therein, and is emitted therefrom.

The optical apparatus includes the optical apparatus according to the first or second embodiment of the present disclosure.

Advantageous Effect of Invention

A display image acquired in a case where a light beam emitted from the center point of an image forming region of the image forming apparatus and passing through the first origin $O_{in}$ along a $\pm Z_{in}$ axis is deflected by the first, third, and second deflection means and is emitted from the light guide plate along the $-Z_{out}$ axis does not spread in a vertically or horizontally symmetric manner about the $-Z_{out}$ axis of the second coordinate system. That is, the display image does not spread in a symmetric manner, for example, with respect to an $X_{out}$ axis in the $X_{out}Y_{out}$ plane or in a symmetric manner with respect to the $Y_{out}$ axis. Therefore, it is difficult to increase the view angle of the display image emitted from the light guide plate by using such an optical apparatus.

However, in the optical apparatuses according to the first and second embodiments of the present disclosure, the optical apparatus included in the image display apparatuses according to the first and second embodiments of the present disclosure, and the optical apparatus included in the optical apparatuses according to the first and second embodiments of the present disclosure, the central outgoing light beam intersects the $X_{out}Y_{out}$ plane and/or the $X_{out}Z_{out}$ plane at a given angle different from zero degrees. Therefore, unlike an optical apparatus of the related art that spreads the display image about an incident ray along the $\pm Z_{in}$ axis, it is possible to further spread the display image region about the central outgoing light beam. It should be noted that the effect described in the present specification is merely illustrative and not restrictive, and there may be additional effects.

BRIEF DESCRIPTION OF DRAWINGS

7A is a schematic diagram of the display apparatus of the working example 1 as viewed from side.

8A and 8B are conceptual diagrams of wave number vectors of first, second, and third deflection means, and so on.

9A and 9B are conceptual diagrams of other wave number vectors of the first, second, and third deflection means, and so on.

Figure 10A:
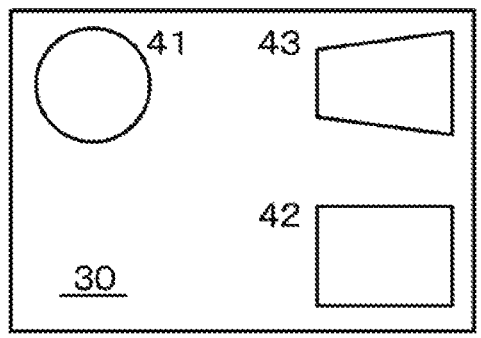
Figure 10B:
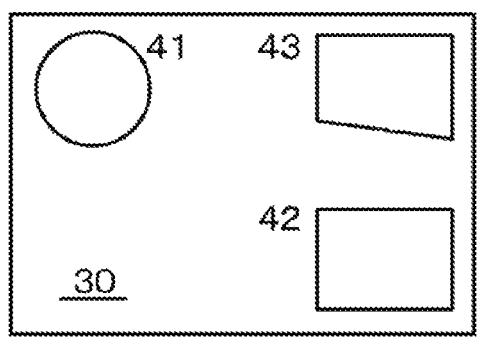
Figure 10C:
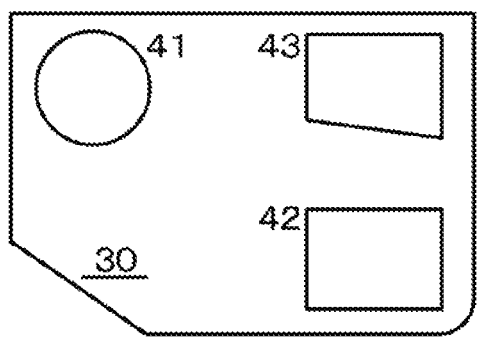

FIGS. 10A, 10B, and 10C are schematic plan views of the first, second and third deflection means, and a light guide plate.

Figure 11:
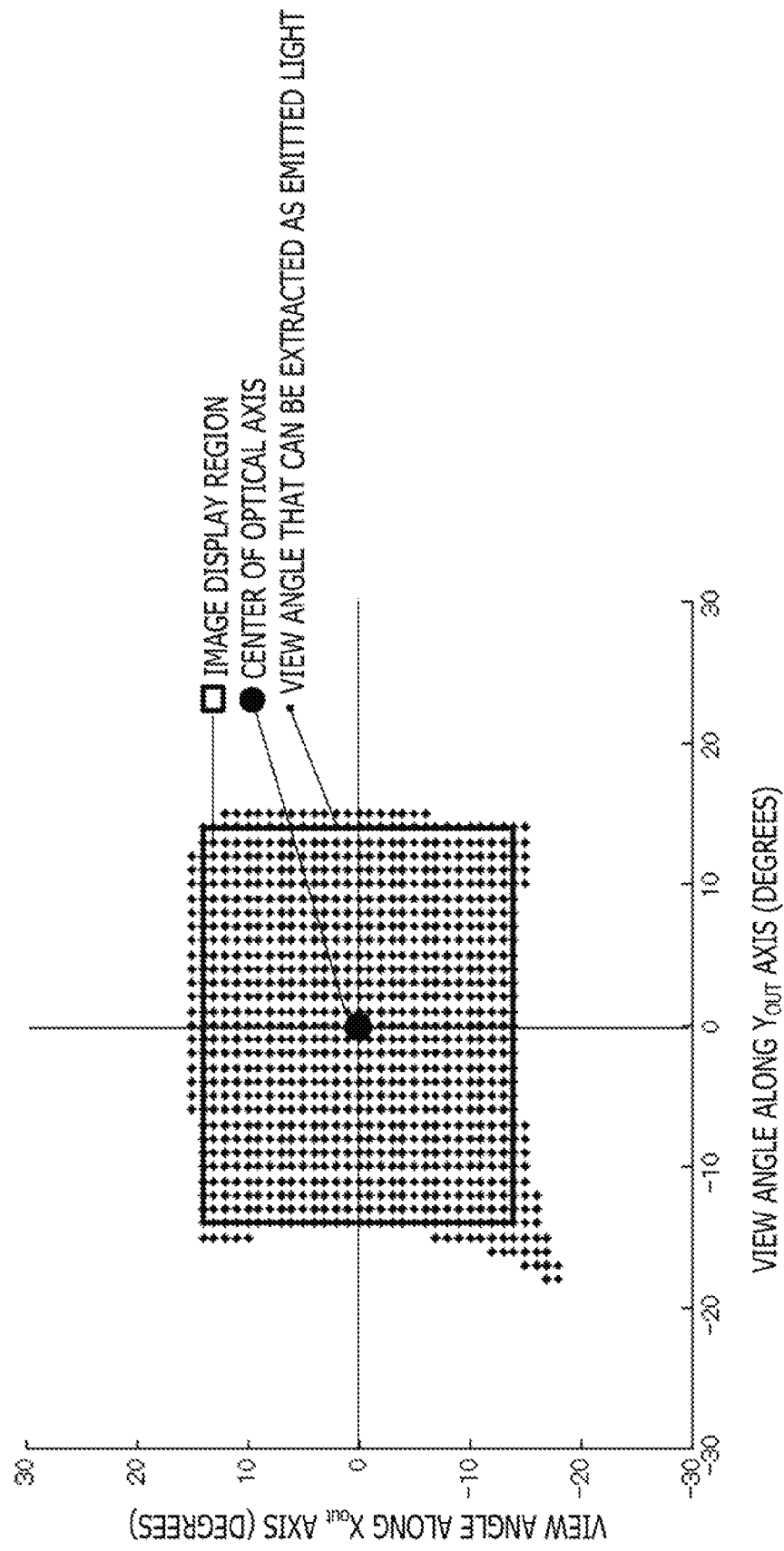

FIG. 11 is a diagram illustrating a result of simulation of a view angle and an image display region that can be extracted as outgoing light in the image display apparatus of the working example 1A.

Figure 12:
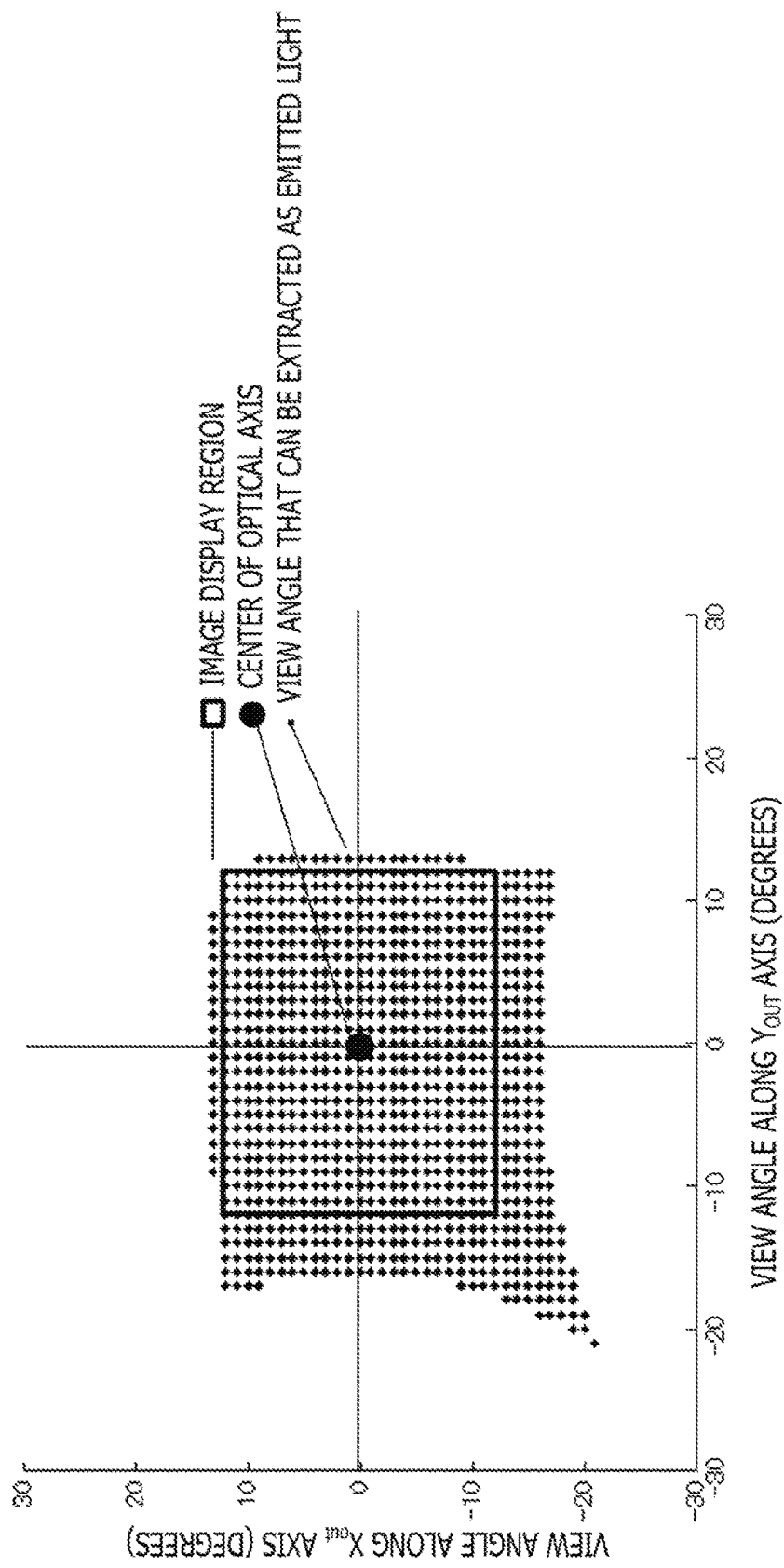

FIG. 12 is a diagram illustrating a result of simulation of the view angle and the image display region that can be extracted as outgoing light in the image display apparatus of a comparative example 1A 1A.

Figure 13:
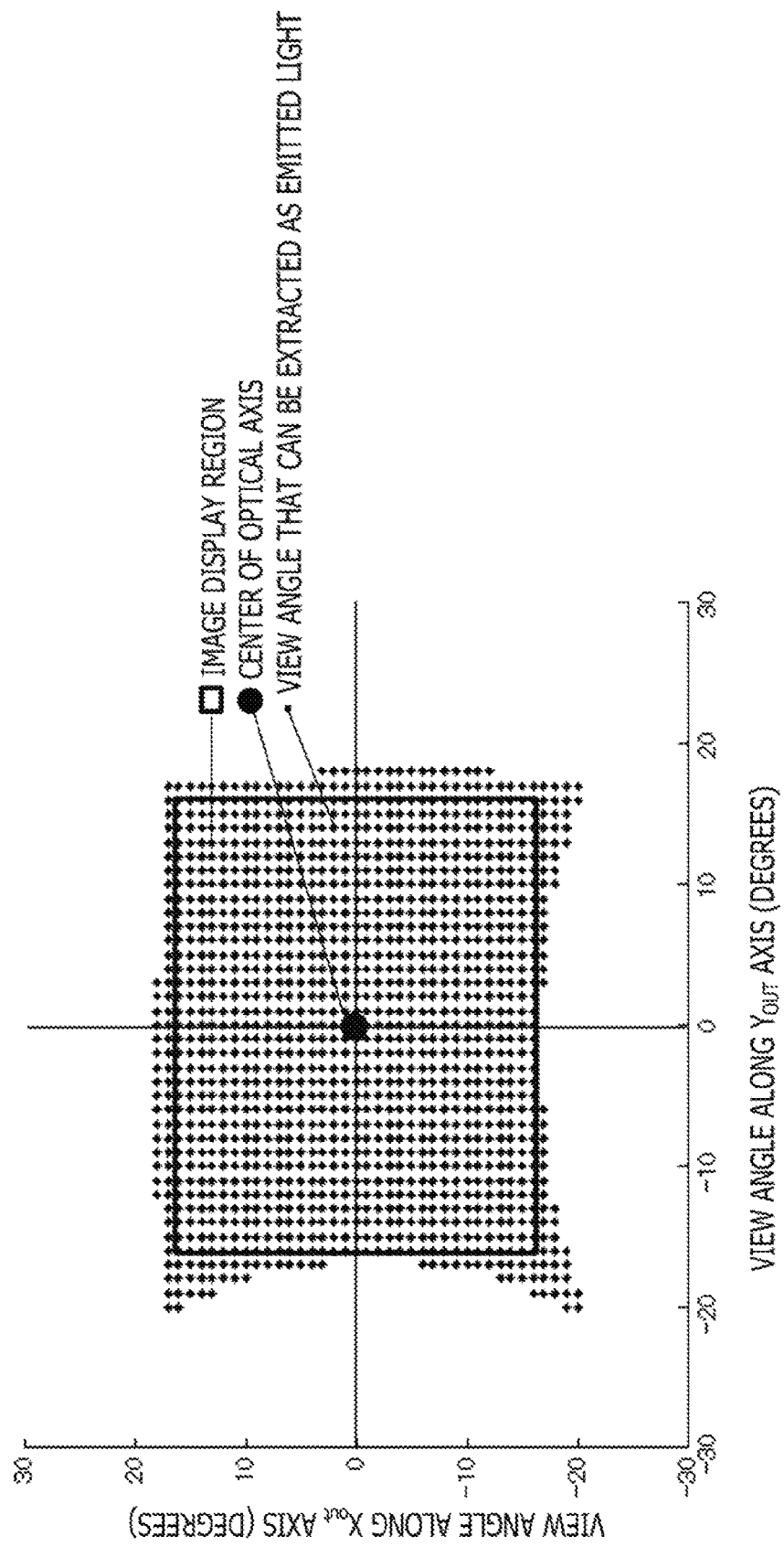

FIG. 13 is a diagram illustrating a result of simulation of the view angle and the image display region that can be extracted as outgoing light in an image display apparatus of the working example 1B.

Figure 14:
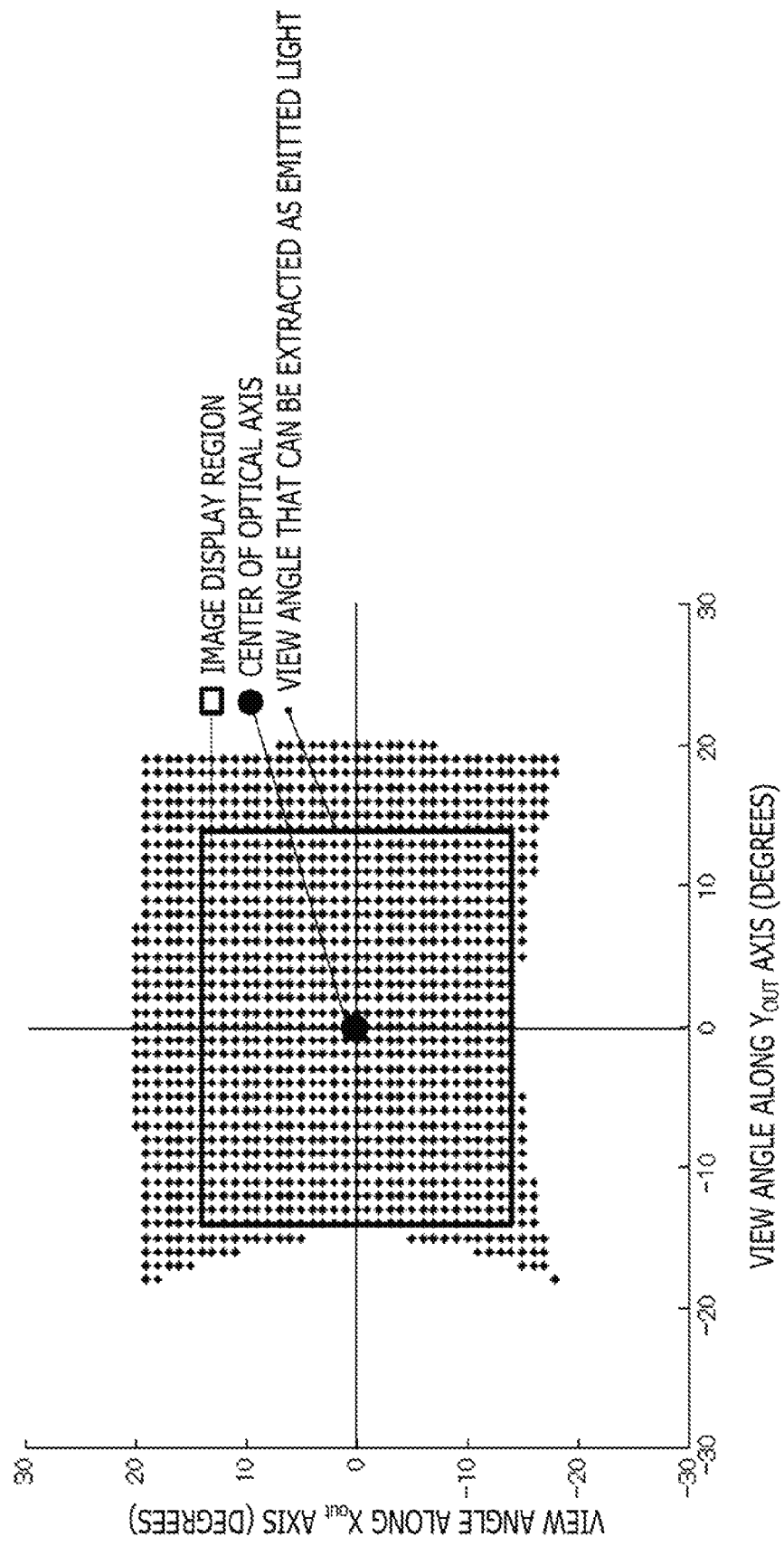

FIG. 14 is a diagram illustrating a result of simulation of the view angle and the image display region that can be extracted as outgoing light in the image display apparatus of a comparative example 1B.

Figure 15:
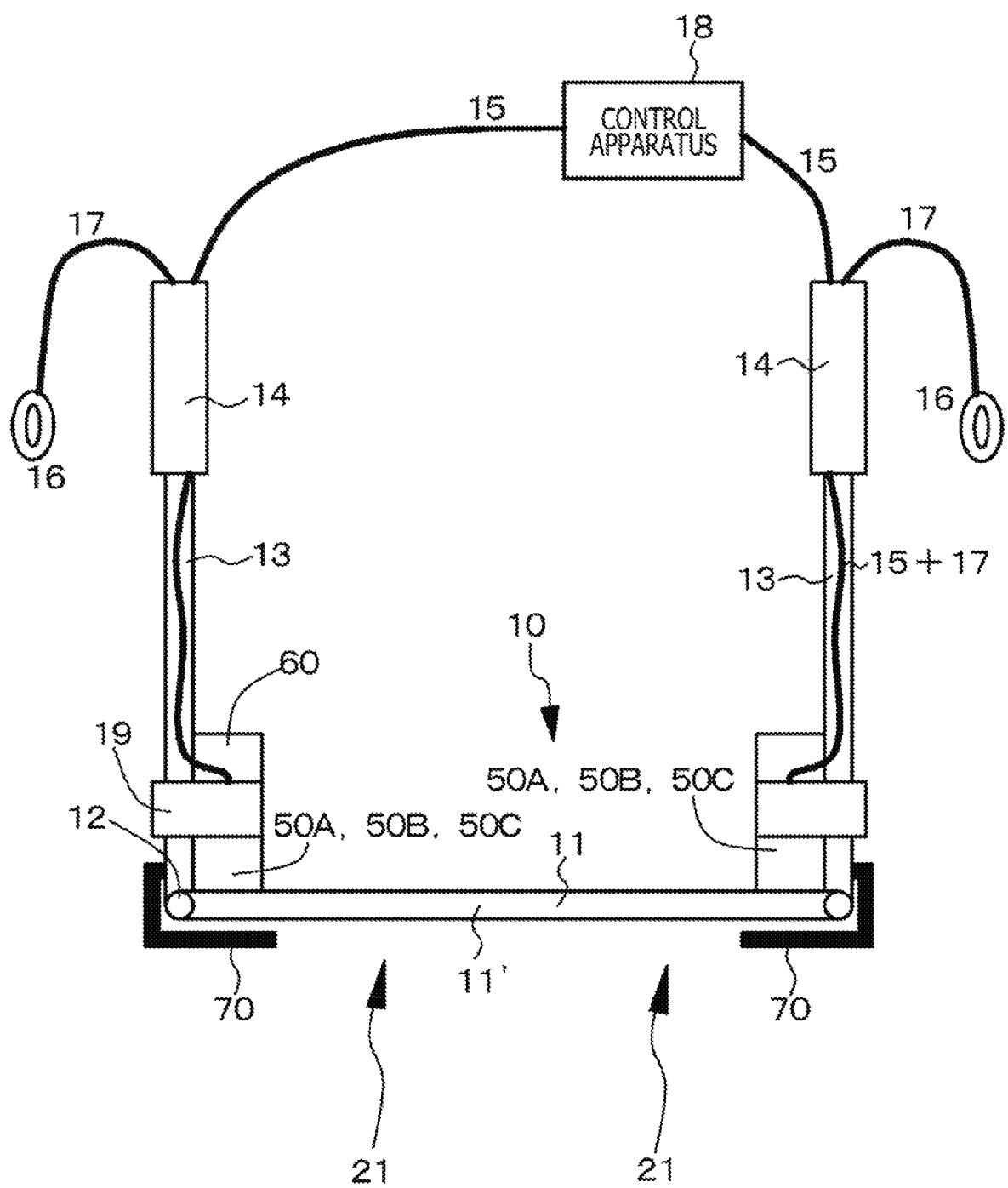

FIG. 15 is a schematic diagram of the modification example of the display apparatus of the working example 1 as viewed from above.

Figure 16A:
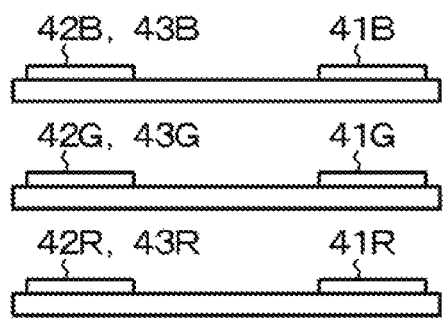
Figure 16B:
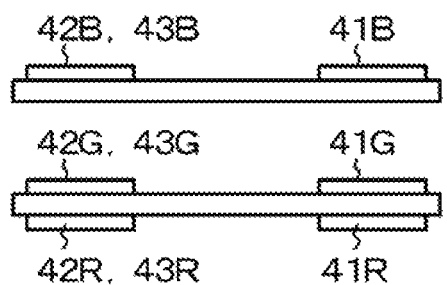
Figure 16C:
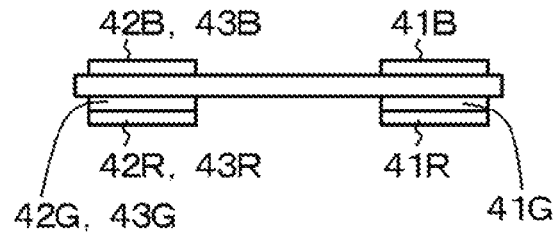

FIGS. 16A, 16B, and 16C are conceptual diagrams of another modification example of the optical apparatus of a modification example 1.

FIGS. 17A, 17B, 17C, 17D, 17E, 17F, 17G, and 17H are conceptual diagrams of still another modification example of the optical apparatus of the working example 1.

DESCRIPTION OF EMBODIMENTS

While a description will be given below of the present disclosure on the basis of a working example with reference to drawings, the present disclosure is not limited to the working example, and various numbers and materials in the working example are illustrative. It should be noted that the description will be given in the following order.

1. General description of the image display apparatuses, the optical apparatuses, and the display apparatuses according to first and second embodiments of the present disclosure
2. Working example 1 (image display apparatuses, optical apparatuses, and display apparatuses of the present disclosure)
3. Others <General Description of the Image Display Apparatus, the Optical Apparatus, and the Display Apparatus According to First and Second Embodiments of the Present Disclosure>

In the optical apparatus according to the first embodiment of the present disclosure, the optical apparatus included in the image display apparatus according to the first embodiment of the present disclosure, or the optical apparatus included in the display apparatus according to the first embodiment of the present disclosure, when, in the first and second coordinate systems, a quadrant where X>0, Y>0, and Z>0 is defined as a first quadrant, a quadrant where X<0, Y>0, and Z>0 is defined as a second quadrant, a quadrant where X<0, Y<0, and Z>0 is defined as a third quadrant, a quadrant where X>0, Y<0, and Z>0 is defined as a fourth quadrant, a quadrant where X>0, Y>0, and Z<0 is defined as a fifth quadrant, a quadrant where X<0, Y>0, and Z<0 is defined as a sixth quadrant, a quadrant where X<0, Y<0, and Z<0 is defined as a seventh quadrant, and a quadrant where X>0, Y<0, and Z<0 is defined as an eighth quadrant, and when the point where the center point of the image forming region in the first coordinate system is located is denoted as point A and the point in the second coordinate system toward which the central outgoing light beam proceeds is denoted as point B, the points A and B can satisfy one of the following (case A), (case B), (case C), (case D), (case E), and (case F). Further, in this case, it is preferable that one of the (case A), (case B), (case D), (case E), and (case F) be satisfied to further increase the view angle of the display image.

(case A)

in a case where the point A is located in the first or fifth quadrant of the first coordinate system, the point B is located in the seventh quadrant of the second coordinate system, (case B)

in a case where the point A is located in the second or sixth quadrant of the first coordinate system, the point B is located in the eighth quadrant of the second coordinate system, (case C)

in a case where the point A is located in the third or seventh quadrant of the first coordinate system, the point B is located in the fifth quadrant of the second coordinate system, (case D)

in a case where the point A is located in the fourth or eighth quadrant of the first coordinate system, the point B is located in the sixth quadrant of the second coordinate system, (case E)

in a case where coordinates of the point A are coordinates $(x_{in}, 0, -z_{in})$ in the first coordinate system, the coordinates of the point B are coordinates $(x_{out}, 0, -z_{out})$ in the second coordinate system, and (case F)

in a case where the coordinates of the point A are coordinates $(0, y_{in}, -z_{in})$ or coordinates $(0, y_{in}, z_{in})$ in the first coordinate system, the coordinates of the point B are coordinates $(0, -y_{out}, -z_{out})$ in the second coordinate system, and $x_{in}$, $y_{in}$, $z_{in}$, $x_{out}$, $y_{out}$, and $z_{out}$ described above satisfy $x_{in} \neq 0$, $y_{in} \neq 0$, $z_{in} > 0$, $x_{out} \neq 0$, $y_{out} \neq 0$, and $z_{out} > 0$.

It should be noted that the first and second coordinate systems are right hand coordinate systems in the image display apparatus for right eye and that the first and second coordinate systems are left hand coordinate systems in the image display apparatus for left eye. Also, the "quadrants" do not include a $\pm X_{in}$ axis, a $\pm Y_{in}$ axis, the $\pm Z_{in}$ axis, a $\pm X_{out}$ axis, a $\pm Y_{out}$ axis, or a $\pm Z_{out}$ axis.

In the optical apparatus according to the first embodiment of the present disclosure including the above preferred mode, the optical apparatus included in the image display apparatus according to the first embodiment of the present disclosure, or the optical apparatus included in the display apparatus according to the first embodiment of the present disclosure, an absolute value of the incident angle of the central incident light beam in the first coordinate system can be equal to an absolute value of the outgoing angle of the central outgoing light beam in the second coordinate system. That is, when an $X_{in}$ component of the unit vector of the central incident light beam is denoted as $x^V_{in\text{-}unit}$, a $Y_{in}$ component thereof is denoted as $y^V_{in\text{-}unit}$, a $Z_{in}$ component thereof is denoted as $z^V_{in\text{-}unit}$, an $X_{out}$ component of the unit vector of the central outgoing light beam is denoted as $x^V_{out\text{-}unit}$, a $Y_{out}$ component thereof is denoted as $y^V_{out\text{-}unit}$, and a $Z_{out}$ component thereof is denoted as $z^V_{out\text{-}unit}$ with reference to the first coordinate system, it is preferable to satisfy as follows.

$$|x^V_{in\text{-}unit}| = |x^V_{out\text{-}unit}|$$

$$|y^V_{in\text{-}unit}| = |y^V_{out\text{-}unit}|$$

$$|z^V_{in\text{-}unit}| = |z^V_{out\text{-}unit}|$$

More specifically, a relationship between the unit vector $(x^V_{in\text{-}unit}, y^V_{in\text{-}unit}, z^V_{in\text{-}unit})$ of the central incident light beam and the unit vector $(x^V_{out\text{-}unit}, y^V_{out\text{-}unit}, z^V_{out\text{-}unit})$ of the central outgoing light beam is identical to a relationship between a unit vector Uv $(x^V_{in\text{-}unit}, y^V_{in\text{-}unit}, z^V_{in\text{-}unit})$ of the central incident light beam and the unit vector Uv $(x^V_{out\text{-}unit}, y^V_{out\text{-}unit}, z^V_{out\text{-}unit})$ of the central outgoing light beam described in the optical apparatus according to the second embodiment of the present disclosure.

In the optical apparatus according to the first embodiment of the present disclosure including the preferred mode described above, the optical apparatus included in the image display apparatus according to the first embodiment of the present disclosure, the optical apparatus included in the display apparatus according to the first embodiment or the optical apparatus according to the second embodiment of the present disclosure, the optical apparatus included in the image display apparatus according to the second embodiment of the present disclosure, and the optical apparatus included in the display apparatus according to the second embodiment of the present disclosure (hereinafter these optical apparatuses may be collectively referred to as "optical apparatuses, etc. of the present disclosure"), at least one of the first, second, or third deflection means can include a volume holographic diffraction grating. The volume holographic diffraction grating may be a transmissive or reflective diffraction grating. A volume holographic diffraction grating refers to a holographic diffraction grating that diffracts only positive primary diffracted light.

Further, in the optical apparatuses, etc. of the present disclosure including the preferred mode described above, each of the first, second, and third deflection means includes a volume holographic diffraction grating, and when a wave number vector acquired by projecting the wave number vector of the first deflection means onto the light guide plate is denoted as $k^V_1$, a wave number vector acquired by projecting the wave number vector of the second deflection means onto the light guide plate is denoted as $k^V_2$, and a wave number vector acquired by projecting the wave number vector of the third deflection means onto the light guide plate is denoted as $k^V_3$, a summation of the wave number vectors $k^V_1$, $k^V_2$, and $k^V_3$ can be zero. Then, more specifically, when the component of $k^V_1$ in the direction of an $X_{in}$ axis is denoted as $k_{1\text{-}X}$, the component of $k^V_1$ in the direction of a $Y_{in}$ axis is denoted as $k_{1\text{-}Y}$, the component of $k^V_2$ in the direction of the $X_{in}$ axis is denoted as $k_{2\text{-}X}$, the component of $k^V_2$ in the direction of the $Y_{in}$ axis is denoted as $k_{2\text{-}Y}$, the component of $k^V_3$ in the direction of the $X_{in}$ axis is denoted as $k_{3\text{-}X}$, and the component of $k^V_2$ in the direction of the $X_{in}$ axis is denoted as $k_{3\text{-}X}$ with reference to the first and second coordinate systems, the following are noted.

$$k_{1\text{-}X} + k_{2\text{-}X} + k_{3\text{-}X} = 0$$

$$k_{1\text{-}Y} + k_{2\text{-}Y} + k_{3\text{-}Y} = 0$$

Further, in the optical apparatuses, etc. of the present disclosure including the preferred mode described above, each of the first, second, and third deflection means includes a volume holographic diffraction grating, and when a diffraction efficiency of the first deflection means for light emitted from the image forming apparatus is denoted as $\eta_1$, a diffraction efficiency of the second deflection means for light emitted from the image forming apparatus is denoted as $\eta_2$, and a diffraction efficiency of the third deflection means for light emitted from the image forming apparatus is denoted as $\eta_3$, the following can be satisfied.

$$\eta_2/\eta_1 < 1$$

$$\eta_3/\eta_1 < 1$$

It should be noted that $\eta_2 \leq 0.2$ and $\eta_3 \leq 0.2$ are satisfied. Here, a diffraction efficiency $\eta$ is represented by $I_1/I_0$ when an intensity of light incident on the volume holographic diffraction grating is denoted as $I_0$ and an intensity of positive primary diffracted light diffracted by the volume holographic diffraction grating is denoted as $I_1$. The diffraction efficiency can be controlled, for example, by thickness of the volume holographic diffraction grating. That is, the thinner the volume holographic diffraction grating, the smaller the diffraction efficiency $\eta$. Also, the larger a refractive index modulation depth $\Delta n$ in the volume holographic diffraction grating, the smaller the diffraction efficiency $\eta$. For example, when light incident on the volume holographic diffraction grating (amount of light=1.0) is emitted from the volume holographic diffraction grating with the diffraction efficiency $\eta$ of 0.2, and when the amount of light emitted from the region of the volume holographic diffraction grating closest to a light incidence section of the volume holographic diffraction grating is denoted as $LI_1$, the amount of light emitted from the region of the volume holographic diffraction grating second closest to the light incidence section of the volume holographic diffraction grating is denoted as $LI_2$, the amount of light emitted from the region of the volume holographic diffraction grating third closest to the light incidence section of the volume holographic diffraction grating is denoted as $LI_3$, and the amount of light emitted from the region of the volume holographic diffraction grating fourth closest to the light incidence section of the volume holographic diffraction grating is denoted as $LI_4$, the following are noted.

$$LI_1 = 1.0 \times 0.2 = 0.2$$

$$LI_2 = (1.0 - 0.2) \times 0.2 = 0.16$$

$$LI_3 = (1.0 - 0.2 - 0.16) \times 0.2 = 0.128$$

$$LI_4 = (1.0 - 0.2 - 0.16 - 0.128) \times 0.2 = 0.102$$

Further, in the optical apparatuses, etc. of the present disclosure including the preferred mode described above, all light deflected by the first deflection means can enter into the third deflection means, and all light deflected by the third deflection means can enter into the second deflection means. Although we assume here that all light deflected by the first or third deflection means enters into the third or second deflection means, part of light deflected by the first deflection means or part of light deflected by the third deflection means may be lost in the light guide plate in some cases.

Further, in the optical apparatuses, etc. of the present disclosure including the preferred mode described above, the refractive index of the material included in the light guide plate can be 1.5 or more, and preferably 1.6 or more.

Further, in the optical apparatuses, etc. of the present disclosure including the preferred mode described above, each of the first, second, and third deflection means includes a volume holographic diffraction grating, and the refractive index of the material included in the volume holographic diffraction grating can be 1.5 or more, and preferably 1.6 or more.

In the optical apparatuses, etc. of the present disclosure including the preferred mode described above, the optical apparatus is a translucent type (see-through type). Specifically, at least a portion of the optical apparatus corresponding to an eyeball (pupil) of the observer can be a translucent type (see-through type) so that outside scenery is visible through these portions of the optical apparatus. Here, the term "translucent" does not mean that one half (50%) of incident light is allowed to pass or reflected but is used to mean that part of incident light is allowed to pass while reflecting the rest of light.

A monochromatic (e.g., green) image can be displayed by the image display apparatus or the display apparatus of the present disclosure. On the other hand, in a case where a color image is displayed, the first deflection means, the third deflection means, and the second deflection means can include P diffraction grating layers stacked one on top of the other, each layer including a volume holographic diffraction grating, to handle P types of light diffraction having P different (e.g., P=3 with types being red, green, and blue) wavelength bands (or wavelengths). Interference fringes corresponding to one wavelength band (wavelength) are formed in each diffraction grating layer. Alternatively, in order to handle P types of light diffraction having P different wavelength bands (or wavelengths), P different interference fringes can be formed in the first deflection means, the third deflection means, and the second deflection means, each including a single diffraction grating layer. Alternatively, for example, a structure can be employed in which a first deflection means, a third deflection means, and a second deflection means, each including a diffraction grating layer that includes a volume holographic diffraction grating for diffracting and reflecting light having a red wavelength band (or wavelength), are disposed on a first light guide plate, in which a first deflection means, a third deflection means, and a second deflection means, each including a diffraction grating layer that includes a volume holographic diffraction grating for diffracting light having a green wavelength band (or wavelength), are disposed on a second light guide plate, in which a first deflection means, a third deflection means, and a second deflection means, each including a diffraction grating layer that includes a volume holographic diffraction grating for diffracting light having a blue wavelength band (or wavelength), are disposed on a third light guide plate, and in which the first light guide plate, the second light guide plate, and the third light guide plate are stacked one on top of the other with a space therebetween. Alternatively, for example, a structure can be employed in which the first deflection means, the third deflection means, and the second deflection means, each including a diffraction grating layer that includes a volume holographic diffraction grating for diffracting and reflecting light having a red wavelength band (or wavelength), are disposed on one side of a first light guide plate, in which the first deflection means, the third deflection means, and the second deflection means, each including a diffraction grating layer that includes a volume holographic diffraction grating for diffracting light having a green wavelength band (or wavelength), are disposed on other side of the first light guide plate, in which the first deflection means, the third deflection means, and the second deflection means, each including a diffraction grating layer that includes a volume holographic diffraction grating for diffracting light having a blue wavelength band (or wavelength), are disposed on a second light guide plate, and in which the first light guide plate and the second light guide plate are stacked one on top of the other with a space therebetween. Alternatively, for example, a structure can be employed in which the first deflection means, the third deflection means, and the second deflection means, each including a diffraction grating layer that includes a volume holographic diffraction grating for diffracting and reflecting light having a red wavelength band (or wavelength) and the first deflection means, the third deflection means, and the second deflection means, each including a diffraction grating layer that includes a volume holographic diffraction grating for diffracting light having a green wavelength band (or wavelength) are stacked one on top of the other on one side of the light guide plate, and in which the first deflection means, the third deflection means, and the second deflection means, each including a diffraction grating layer that includes a volume holographic diffraction grating for diffracting light having a blue wavelength band (or wavelength), are disposed on other side of the light guide plate. Alternatively, P different volume holographic diffraction gratings can be formed on a single diffraction grating layer. Then, by adopting these configurations, it is possible to increase the diffraction efficiency for diffraction of light having each wavelength band (or wavelength) by the first deflection means, the third deflection means, and the second deflection means, increase a diffraction acceptance angle, and optimize a diffraction angle. It is preferable to dispose a protective member so as to prevent the volume holographic diffraction gratings from direct contact with air.

Photopolymer materials can be cited as examples of materials included in the volume holographic diffraction grating. The volume holographic diffraction grating of the optical apparatuses, etc. of the present disclosure need only be identical in constituent material and basic structure to volume holographic diffraction gratings of the related art. Although interference fringes are include the inside to the surface of the volume holographic diffraction grating, such diffraction gratings themselves need only be formed in the same manner of the related art. Specifically, for example, it is only necessary to shine object light from a first given direction on one side onto a material included in the volume holographic diffraction grating and, at the same time, shine reference light from a second given direction on other side onto the material included in the volume holographic diffraction grating (for example, photopolymer materials), and record interference fringes formed by the object light and the reference light in the material included in the volume holographic diffraction grating. A desired interference fringe pitch and a desired interference fringe inclination angle (slant angle) on the surface of the volume holographic diffraction grating can be acquired by properly selecting the first and second given directions and the wavelengths of the object light and the reference light. The interference fringe inclination angle refers to an angle formed between the surface of the volume holographic diffraction grating and the interference fringes. In a case where the volume holographic diffraction grating is formed by a stacked structure of P diffraction grating layers, each including a volume holographic diffraction grating, such stacking of the diffraction grating layers can be achieved, for example, simply by fabricating each of the P diffraction grating layers separately and stacking (bonding) the P diffraction grating layers with a UV curing adhesive. Also, P diffraction grating layers may be fabricated by fabricating a single diffraction grating layer first with a sheet of sticky photopolymer material and then bonding sheets of photopolymer material, one at a time in sequence, on top of the diffraction grating layer so as to fabricate the P diffraction grating layers.

Materials of any photopolymer materials can be used for the material included in the volume holographic diffraction grating (photopolymer material included in a photosensitive material precursor layer before shining of the object light and the reference light) as long as the photopolymer material includes at least a photopolymerizable compound, a binder resin, and a photoinitiator. Known photopolymerizable compounds such as acryl-based monomers, methacryl-based monomers, styrene-based monomers, butadiene-based monomers, vinyl-based monomers, and epoxy-based monomers can be used as a photopolymerizable compound. These may be copolymeric, monofunctional, or multifunctional monomers. Also, these monomers may be used alone or two or more thereof may be used in combination. Also, known binder resins of any kind can be used, and specifically, cellulose acetate-based resins, acryl-based resins, acrylic ester-based resins, methacrylic acid-based resins, epoxy-based resins, urethane-based resins, polypropylene-based resins, polyvinyl ether-based resins, polycarbonate resins, polyamide resins, polyvinyl acetate-based resins, vinyl chloride-based resins, urea-based resins, styrene-based resins, butadiene-based resins, natural rubber-based resins, polyvinyl carbazole, polyethylene glycol, phenol-based resins, or copolymers thereof, gelatin, and so on. Also, binder resins may be used alone, or two or more thereof may be used in combination. As for photoinitiators, known ones of any kind can also be used. Photoinitiators may be used alone, or two or more thereof may be used in combination, and photoinitiators may be used in combination with a plurality of or one photosensitizing dye. A plasticizer, a chain transfer agent, or other additive may be added to the photosensitive material precursor layer. As for a material included in a protective layer for protecting the volume holographic diffraction grating, any materials can be used as long as they are transparent, and the protective layer may be formed by coating, or a material available in the form of a film in advance may be laminated to the photosensitive material precursor layer. Polyvinyl alcohol (PVA) resins, acryl-based resins, polyurethane-based resins, polyethylene terephthalate (PET) resins, triacetyl cellulose (TAC) resins, polymethyl methacrylate (PMMA) resins, polypropylene-based resins, polycarbonate resins, and polyvinyl chloride resins can be cited as examples of materials included in the protective layer.

In the image display apparatus or the image display apparatus of the display apparatus of the present disclosure including the preferred mode described above, the image forming apparatus can include a plurality of pixels arranged in a two-dimensional matrix pattern. It should be noted that such a configuration of an image forming apparatus will be, for convenience, referred to as an "image forming apparatus of a first configuration."

An image forming apparatus that includes a reflective spatial light modulator and a light source, an image forming apparatus that includes a transmissive spatial light modulator and a light source, and an image forming apparatus that includes light emitting-elements such as organic EL (Electro Luminescence) elements, inorganic EL elements, light-emitting diodes (LEDs), or semiconductor laser elements can be cited as examples of the image forming apparatus of the first configuration. Of these, the image forming apparatus that includes a reflective spatial light modulator and a light source or the image forming apparatus that includes organic EL elements is preferable. A light bulb such as LCOS (Liquid Crystal On Silicon) or other transmissive or reflective liquid crystal display apparatus and a digital micromirror device (DMD) can be cited as examples of spatial light modulators, and light-emitting-elements can be cited as examples of light sources. Further, the reflective spatial light modulator can include a liquid crystal display apparatus and a polarization beam splitter. The polarization beam splitter reflects part of light from a light source and guides the light to the liquid crystal display apparatus and, at the same time, allows part of light reflected by the liquid crystal display apparatus to pass and guides the light to an optics. Red, green, blue, and white light-emitting elements can be cited as examples of light-emitting elements included in the light source. Alternatively, white light may be acquired by mixing red, green, and blue light emitted from the red, green, and blue light-emitting elements and evening out luminance thereof with light pipes.

Semiconductor laser elements, solid-state lasers, and LEDs can be cited as examples of light-emitting elements. The number of pixels need only be determined on the basis of the specification required of the image display apparatus, and 320 by 240, 432 by 240, 640 by 480, 1024 by 768, 1920 by 1080, and so on can be cited as examples of specific numbers of pixels.

Alternatively, in the image display apparatus or the image display apparatus of the display apparatus of the present disclosure including the preferred mode described above, the image forming apparatus can include a light source and scanning means. The scanning means scans parallel light beams emitted from the light source. It should be noted that such a configuration of an image forming apparatus will be, for convenience, referred to as an "image forming apparatus of a second configuration."

Light-emitting elements can be cited as examples of light sources of the image forming apparatus of the second configuration, and specifically, red, green, blue, and white light-emitting elements can be cited as examples thereof. Alternatively, white light may be acquired by mixing red, green, and blue light emitted from the red, green, and blue light-emitting elements and evening out luminance thereof with light pipes. Semiconductor laser elements, solid-state lasers, and LEDs can be cited as examples of light-emitting elements. The number of pixels of the image forming apparatus of the second configuration need only be determined on the basis of the specification required of the image display apparatus, and 320 by 240, 432 by 240, 640 by 480, 1024 by 768, 1920 by 1080, and so on can be cited as examples of specific numbers of pixels. Also, in a case where a color image is displayed and the light source includes red, green, and blue light-emitting elements, it is preferable to synthesize colors, for example, using a cross prism. MEMS (Micro Electro Mechanical Systems) including a micromirror that is two-dimensionally rotatable and a galvano mirror for horizontally and vertically scanning light emitted from the light source can be cited as examples of scanning means.

In the image forming apparatus of the first or second configuration, light as a plurality of parallel light beams transformed by an optics (optics for transforming outgoing light from the image forming apparatus into parallel light beams and may be referred to as a "parallel light beam emission optics", and specific examples of which are a collimating optics and a relay optics) is entered into the light guide plate. Such a demand for parallel light beams is based on the need to store light wave front information at the time of entry of these light beams into the light guide plate even after their emission from the light guide plate via the first deflection means, the third deflection means, and the second deflection means. It should be noted that, in order to generate a plurality of parallel light beams, it is only necessary to place a light emission section of the image forming apparatus at the location (position) of a focal distance of the parallel light beam emission optics. The parallel light beam emission optics has a function to convert pixel position information into angular information of the optics of the optical apparatus. Convex lens, concave lens, free-form surface prism, and hologram lens that are used alone or in combination to offer positive optical power as a whole can be named as examples of the parallel light beam emission optics. A light-shielding section having an aperture may be provided between the parallel light beam emission optics and the light guide plate to prevent undesired light from being emitted from the parallel light beam emission optics and becoming incident on the light guide plate.

The light guide plate has two parallel surfaces (first and second surfaces). A thickness direction of the light guide plate corresponds to the $Z_{in}$ and $Z_{out}$ axes. Assuming that the surface of the light guide plate into which light enters is an incident surface of the light guide plate and the surface of the light guide plate from which light is emitted is an emission surface thereof, the incident surface of the light guide plate and the emission surface of the light guide plate may be formed by the first surface, or the incident surface of the light guide plate may be formed by the second surface, and the emission surface of the light guide plate by the first surface. In the former case, the point A is located in the fifth, sixth, seventh, or eighth quadrant, and in the latter case, the point A is located in the first, second, third, or fourth quadrant.

Glass including optical glass such as quartz glass and BK7 and plastic materials (e.g., PMMA, polycarbonate resins, acryl-based resins, amorphous polypropylene-based resins, styrene-based resins including AS resin) can be cited as examples of materials included in the light guide plate. The shape of the light guide plate is not limited to a flat plate and may have a curved shape. BK7, polycarbonate resins, amorphous polypropylene-based resins, and styrene-based resins including AS resin can be named as examples of materials having a refractive index of 1.5 or more, and acryl-based resins can be named as examples of materials having a refractive index of 1.6 or more.

In the image display apparatus or the display apparatus of the present disclosure, a light-shielding member for shielding external light from entering the optical apparatus can be provided in the region of the optical apparatus into which light emitted from the image forming apparatus enters. The provision of a light-shielding member for shielding external light from entering into the optical apparatus in the region of the optical apparatus into which light emitted from the image forming apparatus enters ensures that even if the amount of external light incident on the optical apparatus changes, external light emitted from the image forming apparatus does not enter into the region of the optical apparatus in the first place. This ensures freedom from deterioration of the image display quality of the image display apparatus or the display apparatus due, for example, to undesired stray light. It should be noted that the region of the optical apparatus on which light emitted from the image forming apparatus is incident is preferably included in the image of the light-shielding member projected onto the optical apparatus.

The light-shielding member can be provided on the side opposite to the side where the image forming apparatus of the optical apparatus is provided at a distance from the optical apparatus. Specifically, the light-shielding member for shielding external light from entering into the optical apparatus can be provided in the region of the optical apparatus into which light emitted from the image forming apparatus enters (more specifically, the region of the light guide plate where the first deflection means is provided). In the image display apparatus or the display apparatus configured as described above, it is only necessary to fabricate the light-shielding member with an opaque material (e.g., plastic, metallic, and alloy materials). Such a light-shielding member can extend integrally from a housing of the image display apparatus or be attached to the housing thereof or extend integrally from the frame or be attached to the frame.

The image display apparatus may include a light control apparatus. That is, the optical apparatus may at least partially overlap the light control apparatus. More specifically, it is preferable that at least the second deflection means of the optical apparatus overlap the light control apparatus.

Specifically, the light control apparatus can include first and second substrates, first and second transparent electrodes, and a light control layer. The second substrate is opposed to the first substrate. The first transparent electrode is provided on an opposed surface of the first substrate opposed to the second substrate. The second transparent electrode is provided on an opposed surface of the second substrate opposed to the first substrate. The light control layer is sandwiched between the first and second transparent electrodes. It should be noted that when the light control apparatus is active, for example, a higher voltage is applied to the first transparent electrode than the second transparent electrode.

The light control layer can include an optical shutter that capitalizes on a color change of a material generated by a redox reaction of an inorganic or organic electrochromic material. Specifically, the light control layer can include an inorganic or organic electrochromic material, and further, the light control layer can have, from the side of the first transparent electrode, a stacked structure of inorganic electrochromic material layers such as $WO_3$ layer, $Ta_2O_5$ layer, and $Ir_xSn_{1-x}$ layer or a stacked structure of inorganic electrochromic material layers such as $WO_3$ layer, $Ta_2O_5$ layer, and $IrO_x$ layer. A $MoO_3$ layer or a $V_2O_5$ layer can be used in place of the $WO_3$ layer. Also, a $ZrO_2$ layer or a zirconium phosphate layer can be used in place of the $IrO_x$ layer. Alternatively, a prussian blue complex/nickel-substituted prussian blue complex and so on can also be used. As organic electrochromic materials, electrochromic materials disclosed, for example, in Japanese Patent Laid-Open No. 2014-111710 and Japanese Patent Laid-Open No. 2014-159385 can also be used.

Alternatively, the light control layer can include an electrophoretic liquid, and the light control apparatus can include an optical shutter that capitalizes on an electrodeposition method (electrodeposition/electric field deposition) using an electrodeposition/dissociation phenomenon that takes place by a reversible redox reaction of a metal (e.g., silver particles). That is, the light control apparatus can include an electrolyte including metallic ions.

Here, the electrophoretic liquid includes a number of charged electrophoretic particles and a chromatic dispersion medium different from the electrophoretic particles. For example, in a case where the first transparent electrode is patterned and the second transparent electrode is not patterned (so-called solid electrode), and in a case where the electrophoretic particles are negatively charged, and when a relatively negative voltage is applied to the first transparent electrode and a relatively positive voltage is applied to the second transparent electrode, the negatively charged electrophoretic particles migrate in such a manner as to cover the second transparent electrode. As a result, the light control apparatus has a high shading ratio. On the other hand, when, in contrast to the above, a relatively positive voltage is applied to the first transparent electrode and a relatively negative voltage is applied to the second transparent electrode, the electrophoretic particles migrate in such a manner as to cover the first transparent electrode. As a result, the light control apparatus has a low shading ratio. The shading ratio of the light control apparatus can be controlled by applying voltages to the transparent electrodes properly in this manner. The voltages may be DC or AC. The patterned first transparent electrode need only be shaped such that when the light control apparatus has a low shading ratio as a result of migration of the electrophoretic particles in such a manner as to cover the first transparent electrode, the shading ratio of the light control apparatus can be optimized. The shape of the first transparent electrode need only be determined by conducting various tests. An insulating layer may be formed on the transparent electrodes as necessary. Colorless and transparent insulating resins can be cited as examples of materials included in such an insulating layer, and specifically, for example, acryl-based resins, epoxy-based resins, fluorine-based resins, silicone-based resins, polyimide-based resins, and polystyrene-based resins can be cited as examples.

As materials included in the transparent first and second substrates included in the light control apparatus, specifically, transparent glass substrates such as soda lime glass and white sheet glass, plastic substrates, plastic sheet, and plastic film can be cited as examples. Here, as plastics, polyethylene terephthalate, polyethylene naphthalate, polycarbonate, cellulose esters such as cellulose acetate, fluoropolymers such as a copolymer of polyvinylidene fluoride or polytetrafluoroethylene and hexafluoropropylene, polyethers such as polyoxymethylene, polyolefins such as polyacetal, polystyrene, polyethylene, polypropylene, and methyl pentene polymer, polyimides such as polyamide imide and polyether imide, polyamide, polyether sulfone, polyphenylene sulfide, polyvinylidene fluoride, tetraacetyl cellulose, brominated phenoxy, polyarylate, polysulfone, and so on can be cited as examples. Plastic sheet and plastic film may have enough rigidity to resist easy bending or be flexible. In a case where the first and second substrates include transparent plastic substrates, a barrier layer that includes an inorganic or organic material may be formed in the inner surface of the substrate.

The first and second substrates are sealed and bonded on outer edge portions by a sealing member. As sealing members called sealing agents, various types of resins such as heat-curing, light-curing, humidity-curing, and anaerobic curing resins including epoxy-based resins, urethane-based resins, acryl-based resins, vinyl acetate-based resins, ene-thiol-based resins, silicone-based resins, and modified polymer resins can be used.

If one of the substrates included in the light control apparatus doubles as a constituent member of the optical apparatus (specifically, protective member provided to prevent the volume holographic diffraction grating from direct contact with atmosphere), it is possible to reduce the weight of the display apparatus as a whole, thus eliminating the likelihood of the user of the display apparatus feeling discomfort. It should be noted that the other substrate can be thinner than the one of the substrates.

The first transparent electrode may be patterned or not patterned. The second transparent electrode may be patterned or not patterned, as well. As materials included in the first and second transparent electrodes, specifically, conductive macromolecules such as indium-tin composite oxide (including ITO, Indium Tin Oxide, Sn-doped $In_2O_3$, crystalline ITO, and amorphous ITO), fluorine-doped $SnO_2$ (FTC)), IFO (F-doped $In_2O_3$), antimony-doped $SnO_2$ (ATO), $SnO_2$, ZnO (including Ai-doped ZnO and B-doped ZnO), indium-zinc composite oxide (IZO, Indium Zinc Oxide), spinel-type oxides, oxides having $YbFe_2O_4$ structure, polyaniline, polypyrrole, and polythiophene can be cited as examples but are not limited thereto. Also, two or more thereof can be used in combination. The first and second transparent electrodes can be formed on the basis of vacuum deposition, sputtering, and other physical vapor deposition methods (PVD methods), various chemical vapor deposition methods (CVD methods), and various coating methods, and so on. Patterning can be achieved by arbitrary methods including etching, lift-off, and various methods using masks.

The light control apparatus can be provided on a front portion. Then, in this case, the front portion includes a rim, and the light control apparatus can be fitted in the rim. Also, in the display apparatus of the present disclosure including various preferred modes described above, the optical apparatus and the light control apparatus may be arranged in this order, or the light control apparatus and the optical apparatus may be arranged in this order from the observer side.

An illuminance sensor for measuring the illuminance of the environment where the display apparatus is installed (environmental illuminance measurement sensor) can be further provided, thus controlling the shading ratio of the light control apparatus on the basis of measurement results of the illuminance sensor (environmental illuminance measurement sensor). Alternatively, an illuminance sensor for measuring the illuminance of the environment where the display apparatus is installed (environmental illuminance measurement sensor) can be further provided, thus controlling the luminance of images formed by the image forming apparatus on the basis of measurement results of the illuminance sensor (environmental illuminance measurement sensor). These modes can be used in combination.

Alternatively, a second illuminance sensor for measuring the illuminance based on light that has passed through the light control apparatus from an external environment (may be referred to as a "transmitted light illuminance measurement sensor" for convenience) can be further provided, thus controlling the shading ratio of the light control apparatus on the basis of measurement results of the second illuminance sensor (transmitted light illuminance measurement sensor).

Alternatively, a second illuminance sensor for measuring the illuminance based on light that has passed through the light control apparatus from an external environment (transmitted light illuminance measurement sensor) can be further provided, thus controlling the luminance of images formed by the image forming apparatus on the basis of measurement results of the second illuminance sensor (transmitted light illuminance measurement sensor). It should be noted that the second illuminance sensor (transmitted light illuminance measurement sensor) is desirably provided closer to the observer side than the optical apparatus. At least two second illuminance sensors (transmitted light illuminance measurement sensors) may be provided to measure the illuminance based on light that has passed through a portion with a high shading ratio and the illuminance based on light that has passed through a portion with a low shading ratio. These modes may be used in combination. Further, these modes and the mode for performing control on the basis of measurement results of the illuminance sensor (environmental illuminance measurement sensor) may be used in combination.

The illuminance sensors (environmental illuminance measurement sensor and transmitted light illuminance measurement sensor) each need only include a known illuminance sensor and be controlled on the basis of a known control circuit.

The maximum light transmittance of the light control apparatus can be 50% or more, and the minimum light transmittance thereof can be 30% or less. It should be noted that 99% can be cited as an example of an upper limit of the maximum light transmittance of the light control apparatus and that 1% can be cited as an example of a lower limit of the minimum light transmittance. Here, the following relationship is held.

(Light transmittance)=1−(Shading ratio)

It is only necessary to attach a connector to the light control apparatus (specifically, attaching a connector to a first or a second transparent electrode) and electrically connect the light control apparatus to a control circuit for controlling the shading ratio of the light control apparatus (light control apparatus/control circuit and included, for example, in a control apparatus for controlling the image forming apparatus) via this connector and wiring.

In some cases, light passing through the light control apparatus can be colored with a desired color. Then, in this case, the color with which light is colored can be variable. Alternatively, the color with which light is colored can be fixed. It should be noted that, in the former case, it is only necessary to stack, for example, a light control apparatus for coloring light with red, a light control apparatus for coloring light with green, and a light control apparatus for coloring light with blue. Also, in the latter case, brown can be cited as an example of a color with which light is colored by the light control apparatus although the color is not limited thereto.

The observer can manually control and adjust the shading ratio by observing brightness of light passing through the light control apparatus and the optical apparatus and manipulating switches, buttons, dials, sliders, knobs, and so on. Alternatively, the observer can control and adjust the shading ratio on the basis of measurement results of the second illuminance sensor (transmitted light illuminance measurement sensor) described earlier for measuring the illuminance based on light that has passed through the light control apparatus from an external environment. It should be noted that, specifically, control over and adjustment of the shading ratio need only be achieved by controlling the voltages applied to the first and second transparent electrodes. At least two second illuminance sensors (transmitted light illuminance measurement sensors) may be provided to measure the illuminance based on light that has passed through a portion with a high shading ratio and the illuminance based on light that has passed through a portion with a low shading ratio. The display apparatus may include one or two image display apparatuses. In a case where the display apparatus includes two image display apparatuses, it is possible, by adjusting the voltages applied to the first and second transparent electrodes, to even out the shading ratios of one of the light control apparatuses and the other light control apparatus. The shading ratio of one of the light control apparatuses and that of the other light control apparatus can be controlled, for example, on the basis of measurement results of the second illuminance sensor (transmitted light illuminance measurement sensor) described earlier for measuring the illuminance based on light that has passed through the light control apparatuses from an external environment. Alternatively, the observer can manually control and adjust the shading ratio by observing the brightness of light passing through one of the light control apparatuses and the other light control apparatus and manipulating switches, buttons, dials, sliders, knobs, and so on. In a case where the shading ratio is adjusted, a test pattern may be displayed on the optical apparatus.

In the display apparatus of the present disclosure, the frame includes the front portion provided in front of the observer and two temple portions rotatably attached to both ends of the front portion via hinges. It should be noted that a temple tip portion is attached to an edge of each of the temple portions. Although the image display apparatus is attached to the frame, specifically, it is only necessary to attach the image forming apparatus to the temple portions. Also, the front portion and the two temple portions can be integral. That is, when one looks at the display apparatus of the present disclosure as a whole, the frame has substantially the same structure as ordinary glasses. The frame including a pad portion can include the same materials as those included in ordinary glasses, examples of which are metals, alloys, plastics, and combinations thereof. Further, a nose pad can be attached to the front portion. That is, when one looks at the display apparatus of the present disclosure as a whole, an assembly of the frame (including the rim) and the nose pad has substantially the same structure as ordinary glasses. The nose pad can also have a known configuration and structure.

Also, in the display apparatus of the present disclosure, from the viewpoint of design, wearing ease, and so on, it is desirable that wiring (e.g., signal line and power line) from one or two image forming apparatuses extend externally from an edge of the temple tip portion via the temple portion and the inside of the temple tip portion and be connected to the control apparatus (control circuit or control means). Further, each image forming apparatus can include a headphone section so that headphone section wiring from each image forming apparatus extends from the edge of the temple tip portion to the headphone section via the temple portion and the inside of the temple tip portion. An inner ear-type headphone section and a canal-type headphone section can be cited as examples of the headphone section. The headphone section wiring, more specifically, preferably extends to the headphone section in such a manner as to get around the back side of an auricle (ear shell). Also, an imaging apparatus can be attached to a center portion of the front portion. Specifically, the imaging apparatus includes, for example, a solid-state imaging element and a lens. The solid-state imaging element includes a CCD or CMOS sensor. Wiring from the imaging apparatus need only be connected to one of the image display apparatuses (or the image forming apparatus) via the front portion and further be included in wiring extending from the image display apparatus (or the image forming apparatus).

A head-mounted display (HMD), for example, can include the display apparatus of the present disclosure. Then, this makes it possible to reduce the weight and size of the display apparatus and significantly ease discomfort while the display apparatus is worn and further contributes to reduced manufacturing costs. Alternatively, the image display apparatus of the present disclosure is applicable to a head-up display (HUD) provided in a cockpit or other area of a vehicle or an aircraft. Specifically, the HUD can have a virtual image forming region on a windshield of the cockpit or other area of the vehicle or the aircraft. A virtual image is formed in the virtual image forming region on the basis of light emitted from the image forming apparatus. Alternatively, the HUD can have a combiner with a virtual image forming region on the windshield of the cockpit or other area of the vehicle or the aircraft. A virtual image is formed in the virtual image forming region on the basis of light emitted from the image forming apparatus.

Working Example 1

Figure 1A:
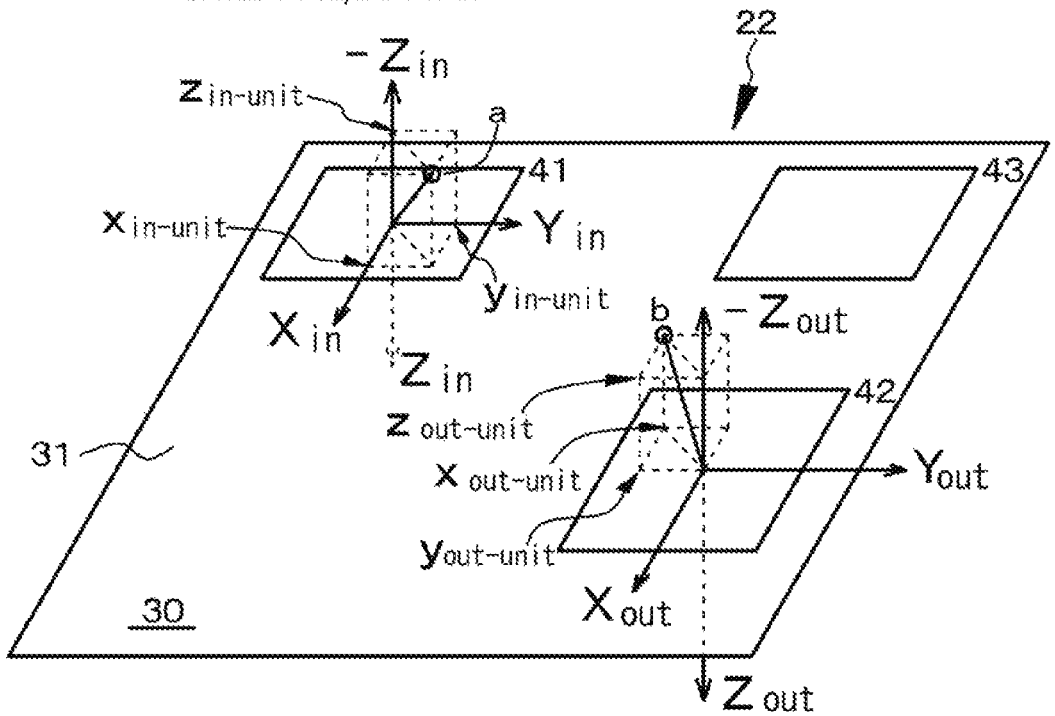
FIGS. 1A and 1B are a conceptual diagram including a coordinate system of an optical apparatus of a working example 1 and a conceptual diagram including a coordinate system of an image display apparatus of the working example 1, respectively.
Figure 1B:
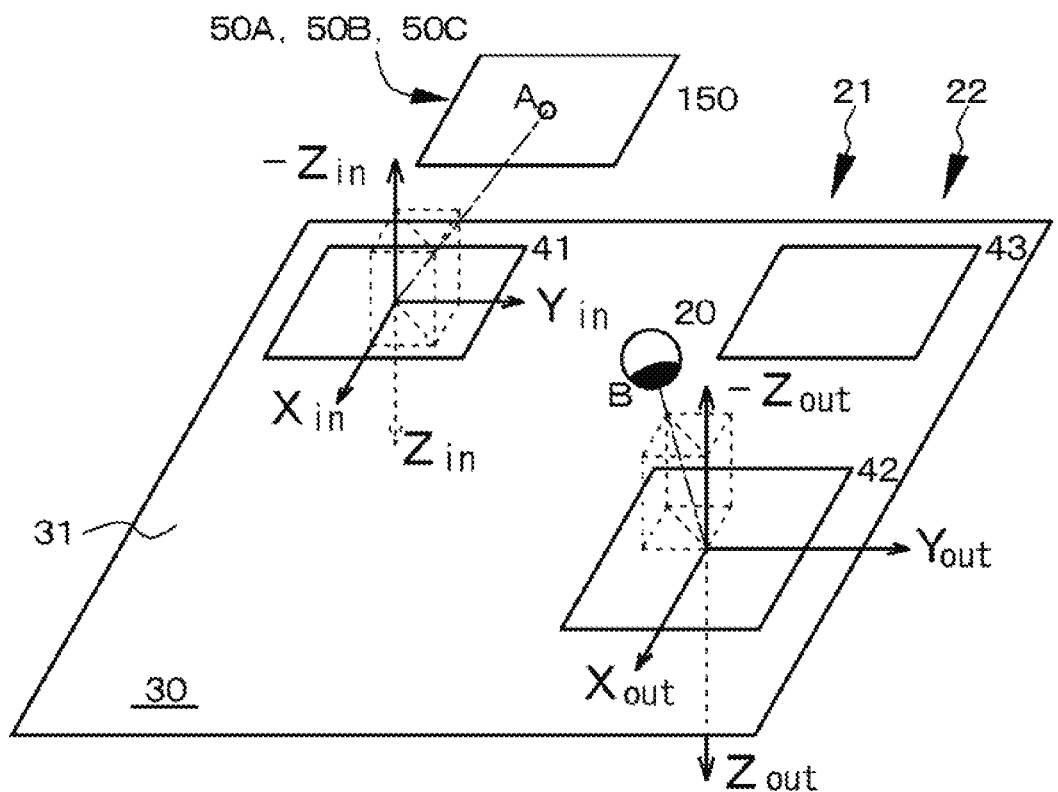
Figure 2:
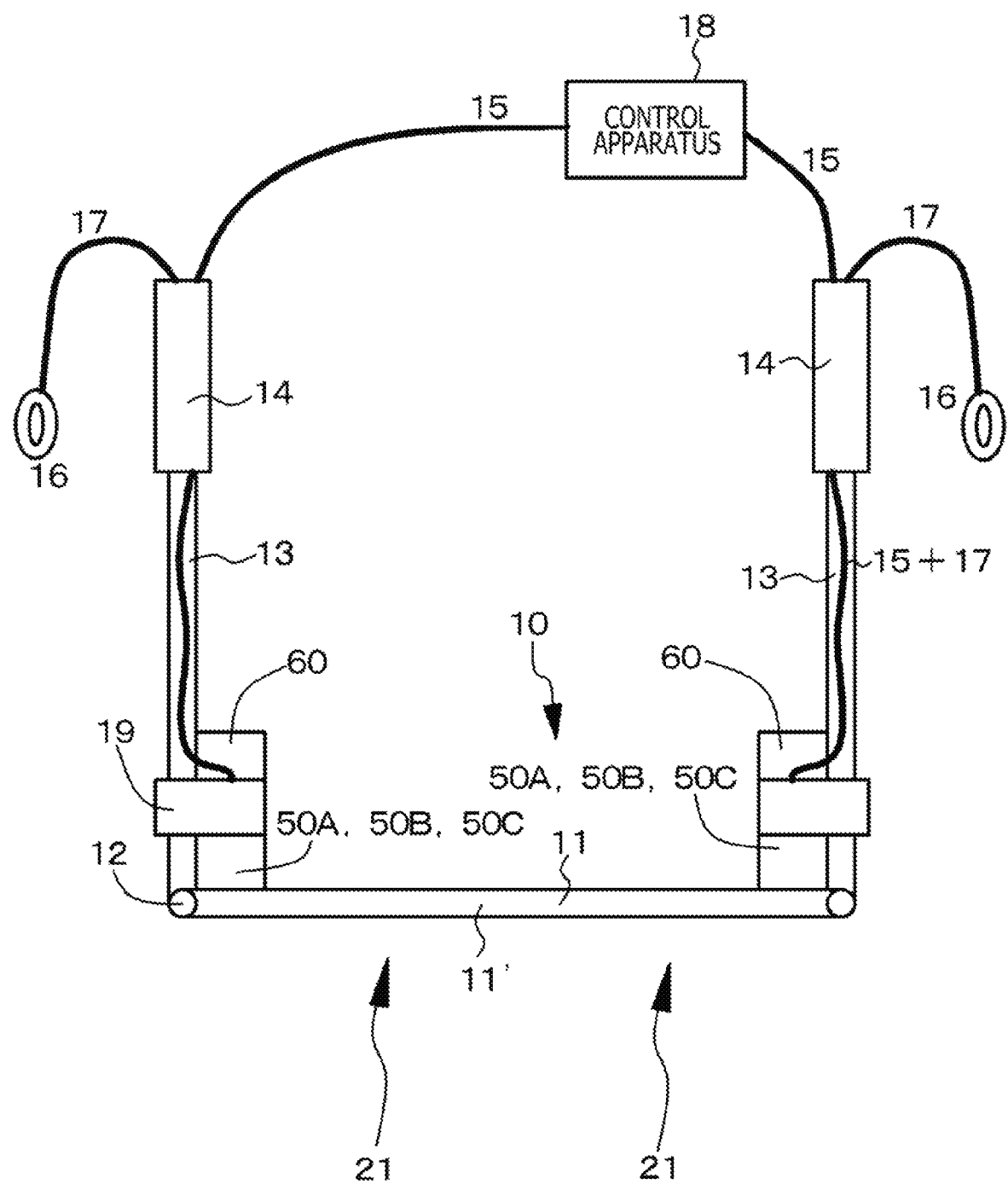
FIG. 2 is a schematic diagram of a display apparatus of the working example 1 as viewed from above.
Figure 3:
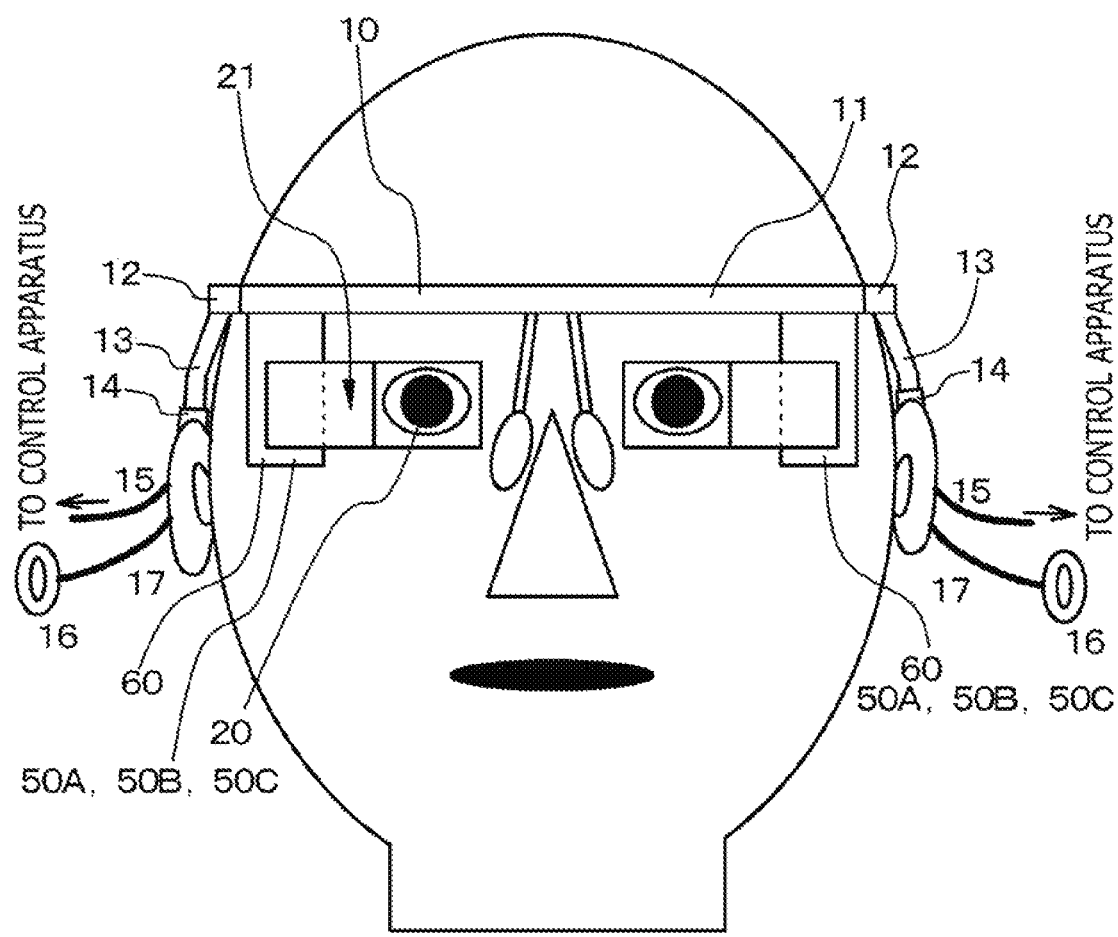
FIG. 3 is a schematic diagram of the display apparatus of the working example 1 as viewed from front.
Figure 4:
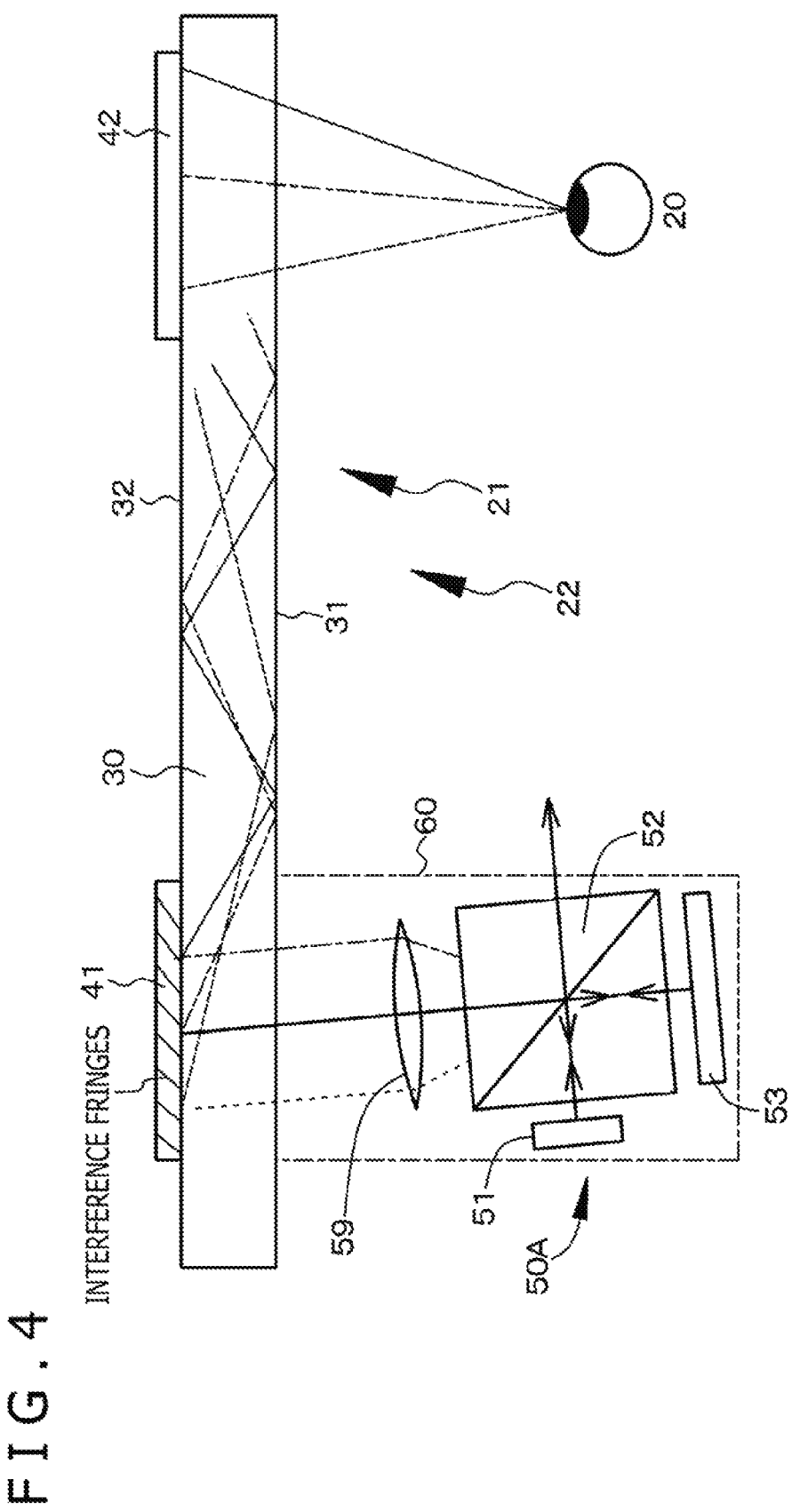
FIG. 4 is a conceptual diagram of the image display apparatus of the working example 1.
Figure 5:
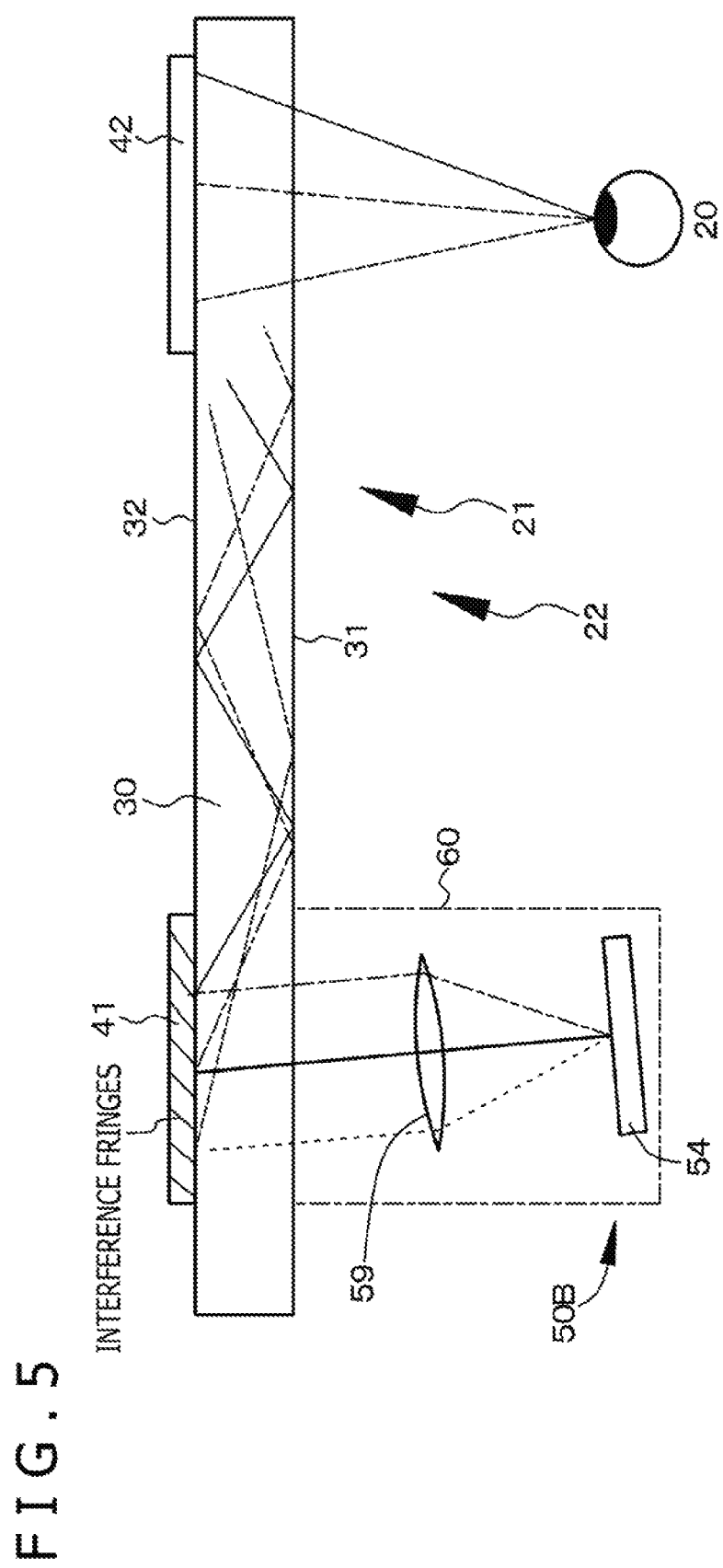
FIG. 5 is a conceptual diagram of a modification example of the image display apparatus of the working example 1.
Figure 6:
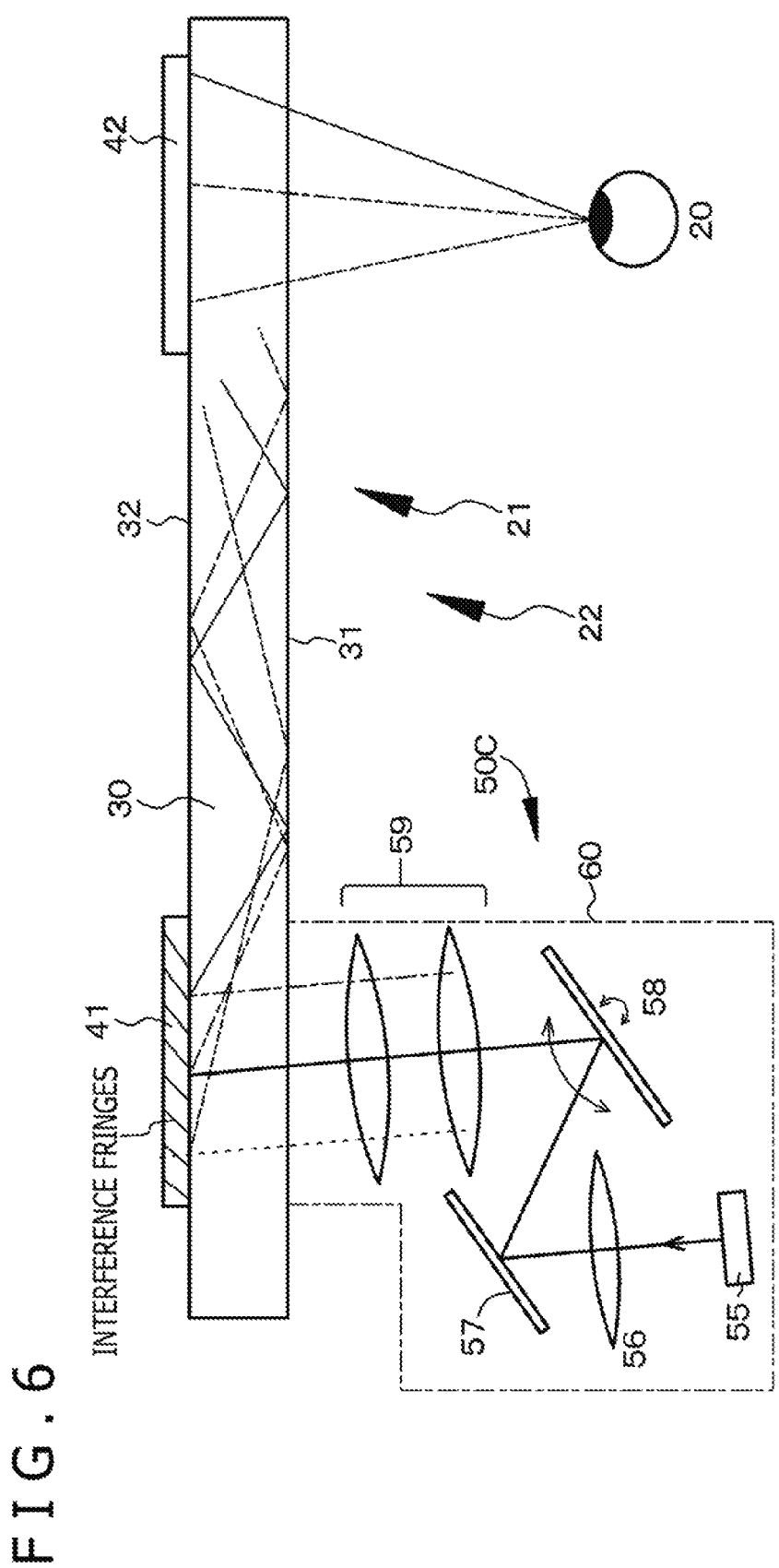
FIG. 6 is a conceptual diagram of another modification example of the image display apparatus of the working example 1.
Figure 7A:
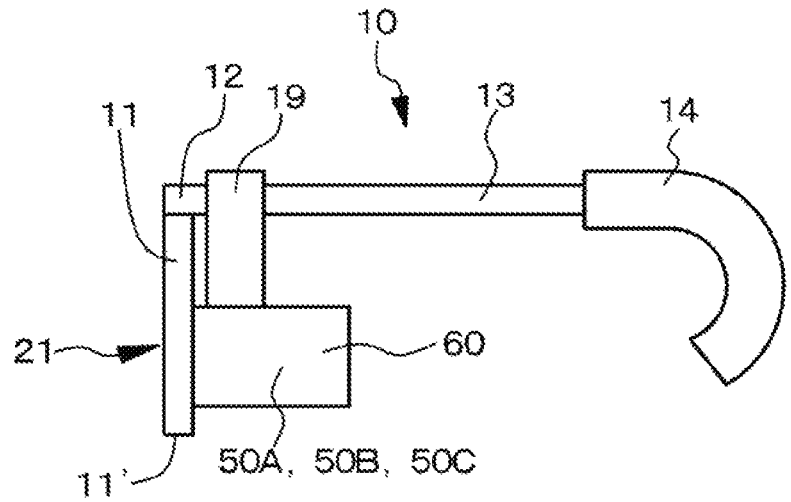
FIG. 7B is a schematic sectional view of the display apparatus of the working example 1 when the optical apparatus is cut along an $X_{in} Y_{in}$ plane.
FIG. 7C is a schematic sectional view of the display apparatus of the working example 1 when the optical apparatus is cut along an $X_{out} Y_{out}$ plane.
Figure 7B:
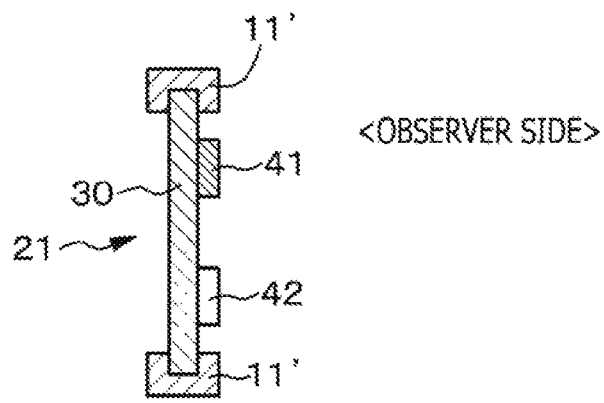
Figure 7C:
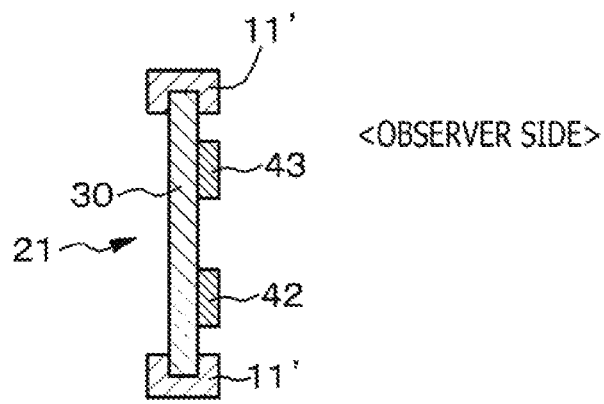

Working example 1 relates to the optical apparatuses according to the first and second embodiments of the present disclosure, the image display apparatuses according to the first and second embodiments of the present disclosure, and the display apparatuses according to the first and second embodiments. FIGS. 1A and 1B illustrate a conceptual diagram including a coordinate system of the optical apparatus of the working example 1 and a conceptual diagram including a coordinate system of the image display apparatus of the working example 1, respectively. Also, FIG. 2 illustrates a schematic diagram of the display apparatus of the working example 1 as viewed from above, FIG. 3 illustrates a schematic diagram of the display apparatus of the working example 1 as viewed from front, FIGS. 4, 5, and 6 illustrate conceptual diagrams of the image display apparatus and modification examples thereof, FIG. 7A illustrates a schematic diagram of the display apparatus of the working example 1 as viewed from side, FIG. 7B illustrates a schematic sectional view of the display apparatus of the working example 1 when the optical apparatus is cut along an $X_{in}Y_{in}$ plane, and FIG. 7C illustrates a schematic sectional view of the display apparatus of the working example 1 when the optical apparatus is cut along an $X_{out}Y_{out}$ plane; and FIGS. 8A, 8B, 9A, and 9B illustrate conceptual diagrams of wave number vectors of first, second, and third deflection means, and so on.

An optical apparatus 22 of the working example 1 is an optical apparatus into which light emitted from image forming apparatuses 50A, 50B, and 50C enters, in which the light is guided, and from which the light is emitted. Then, the optical apparatus 22 includes a light guide plate 30, first deflection means 41, second deflection means 42, and third deflection means 43. The incident light propagates in the light guide plate 30 by total reflection and then is emitted therefrom. The first deflection means 41 deflects the light entering into the light guide plate 30 in such a manner that the light is totally reflected in the light guide plate 30. The second deflection means 42 deflects the light that has propagated in the light guide plate 30 by total reflection in such a manner as to cause the light to be emitted from the light guide plate 30. The third deflection means 43 deflects the light that has been deflected by the first deflection means 41 and that has propagated in the light guide plate 30 by total reflection toward the second deflection means 42.

First and second coordinate systems are assumed. In the first coordinate system, a point where a normal line of the light guide plate 30 passing through a center point of the first deflection means 41 intersects the light guide plate is denoted as a first origin $O_{in}$, a normal line of the light guide plate 30 passing through the first origin $O_{in}$ and extending toward a side where light is emitted from the light guide plate 30 is denoted as a $-Z_{in}$ axis, and an axis parallel to a traveling direction of the light that is deflected by the first deflection means 41 and propagates in the light guide plate 30 by total reflection and passing through the first origin $O_{in}$ is denoted as a $+Y_{in}$ axis.

In the second coordinate system, a point where a central incident light beam, a light beam emitted from the center point (point A) of the image forming regions of the image forming apparatuses 50A, 50B, and 50C and passing through the first origin $O_{in}$, is emitted from the light guide plate 30, is denoted as a second origin $O_{out}$, a normal line of the light guide plate 30 passing through the second origin $O_{out}$ and extending toward the side where light is emitted from the light guide plate 30 is denoted as a $-Z_{out}$ axis, and an axis parallel to the $+Y_{in}$ axis and passing through the second origin $O_{out}$ is denoted as a $+Y_{out}$ axis.

At this time, the central outgoing light beam, a light beam at the time of emission of the central incident light beam from the light guide plate 30, intersects the $X_{out}Y_{out}$ plane at an angle different from zero degrees, or intersects the $X_{out}Z_{out}$ plane at an angle different from zero degrees, or intersects the $X_{out}Y_{out}$ plane at an angle different from zero degrees and intersects the $X_{out}Z_{out}$ plane at an angle different from zero degrees. The $\pm X_{in}$ axis and the $\pm X_{out}$ axis are parallel, the $\pm Y_{in}$ axis and the $\pm Y_{out}$ axis are parallel, and the $\pm Z_{in}$ axis and the $\pm Z_{out}$ axis are parallel.

Alternatively, put differently, the incident angle of the central incident light beam, a light beam emitted from the center point of the image forming regions of the image forming apparatuses 50A, 50B, and 50C on the light guide plate 30, is an angle other than zero degrees (an angle different from zero degrees), and the unit vector of the central incident light beam and the unit vector of the central outgoing light beam, a light beam at the time of emission of the central incident light beam from the light guide plate 30, are identical in magnitude. It should be noted that, broadly, the unit vectors of the respective light beams emitted from the image forming regions of the image forming apparatuses 50A, 50B, and 50C and the unit vectors of these respective light beams at the time of emission from the light guide plate 30 are identical in magnitude. A description will be given later of the directions of the unit vectors.

An image display apparatus 21 of the working example 1 includes the image forming apparatuses 50A, 50B, and 50C and an optical apparatus into which light emitted from the image forming apparatuses 50A, 50B, and 50C enters, in which the light is guided, and from which the light is emitted.

The optical apparatus includes the optical apparatus 22 of the working example 1 described above.

The display apparatus of the working example 1 includes a frame 10 and the image display apparatus 21. The frame 10 is worn on an observer' head. The image display apparatus 21 is attached to the frame.

The image display apparatus 21 includes the image forming apparatuses 50A, 50B, and 50C and an optical apparatus into which light emitted from the image forming apparatuses 50A, 50B, and 50C enters, in which the light is guided, and from which the light is emitted.

The optical apparatus includes the optical apparatus 22 of the working example 1 described above.

Although the display apparatuses of the working example is specifically binocular types including the two image display apparatuses 21, they may be monocular types including the single image display apparatus 21. The first and second coordinate systems are right hand coordinate systems in the image display apparatus for a right eye, and the first and second coordinate systems are left hand coordinate systems in the image display apparatus for a left eye. The optical apparatus 22 is a see-through type (translucent type). Also, although monochromatic images are displayed by the image forming apparatuses 50A, 50B, and 50C, the types of images displayed are not limited thereto.

Then, when the first, second, third, fourth, fifth, sixth, seventh, and eighth quadrants are defined in the first and second coordinate systems as described earlier, when the point where the center point of the image forming region in the first coordinate system is located is denoted as the point A, and when the point in the second coordinate system toward which the central outgoing light beam proceeds is denoted as the point B, the points A and B satisfy one of the following (case A), (case B), (case C), (case D), (case E), and (case F) described earlier. Further, it is preferable that one of the (case A), (case B), (case D), (case E), and (case F) be satisfied to further increase the view angle of the display image.

The example illustrated in FIGS. 1A and 1B corresponds to the (case A), and the point A is located in the fifth quadrant of the first coordinate system, and the point B is located in the seventh quadrant of the second coordinate system. The center point of the image forming regions of the image forming apparatuses 50A, 50B, and 50C is located at the point A, and a pupil 20 of the observer is located at the point B. Also, a start point of the unit vector of the central incident light beam at the time of entry into the light guide plate 30 is represented by a "point a" in FIG. 1A, and an end point of the unit vector of the central outgoing light beam at the time of emission from the light guide plate 30 in the second coordinate system is represented by a "point b" in FIG. 1A. It should be noted that the end point of the unit vector of the central outgoing light beam is the first origin $O_{in}$ and that the start point of the unit vector of the central incident light beam is the second origin $O_{out}$.

Further, the absolute value of the incident angle of the central incident light beam in the first coordinate system and the absolute value of an outgoing angle of the central outgoing light beam in the second coordinate system are equal. That is, when the unit vector of the central incident light beam is denoted as $(x^V_{in\text{-}unit}, y^V_{in\text{-}unit}, z^V_{in\text{-}unit})$ with respect to the first coordinate system, and when the unit vector of the central outgoing light beam is denoted as $(x^V_{out\text{-}unit}, y^V_{out\text{-}unit}, z^V_{out\text{-}unit})$ with respect to the second coordinate system, the following are satisfied.

$|x^V_{in\text{-}unit}| = |x^V_{out\text{-}unit}|$ $|y^V_{in\text{-}unit}| = |y^V_{out\text{-}unit}|$ $|z^V_{in\text{-}unit}| = |z^V_{out\text{-}unit}|$ Alternatively, $x^V_{in\text{-}unit} = x^V_{out\text{-}unit}$ $y^V_{in\text{-}unit} = y^V_{out\text{-}unit}$ and $z^V_{in\text{-}unit} = z^V_{out\text{-}unit}$ or $z^V_{in\text{-}unit} = z^V_{out\text{-}unit}$ The example illustrated herein is as follows.

$z^V_{in\text{-}unit} = -z^V_{out\text{-}unit}$

Figure 8A:
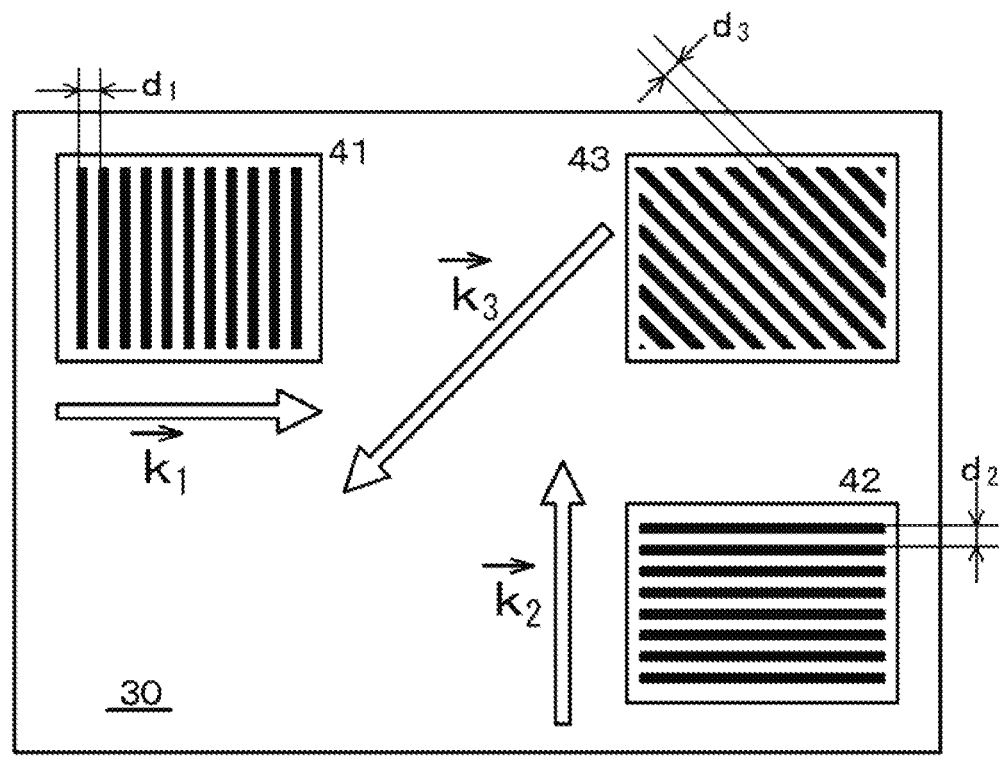
Figure 8B:
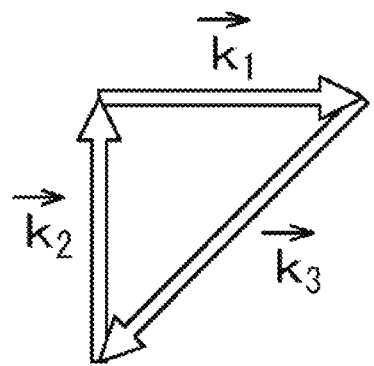
Figure 9A:
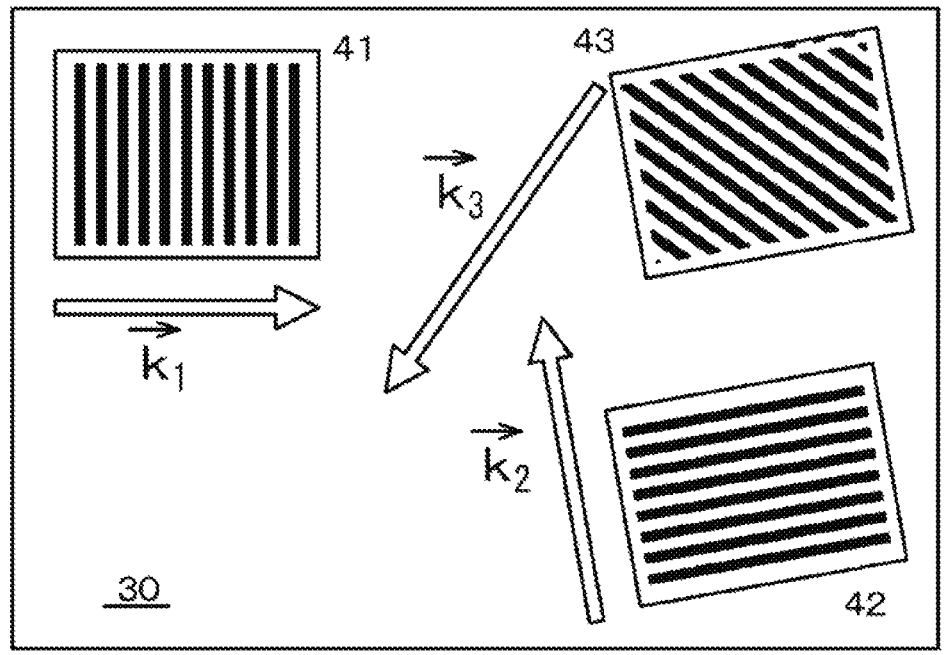
Figure 9B:
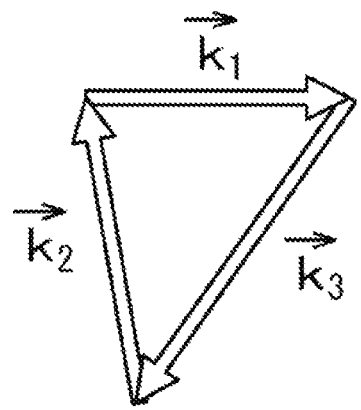

It should be noted that the rectangle formed by the conceptually illustrated wave number vectors $k^V_1$, $k^V_2$, and $k^V_3$ is a right isosceles triangle in the example illustrated in FIGS. 8A and 8B and is an irregular triangle in the example illustrated in FIGS. 9A and 9B. It should be noted that the rectangle formed by the wave number vectors $k^V_1$, $k^V_2$, and $k^V_3$ is not limited to these triangles.

Also, at least one of the first deflection means 41, the second deflection means 42, or the third deflection means 43 includes a volume holographic diffraction grating. Alternatively, as illustrated in FIGS. 8A, 8B, 9A, and 9B, each of the first deflection means 41, the second deflection means 42, and the third deflection means 43 includes a volume holographic diffraction grating (specifically, a reflective volume holographic diffraction grating), and when the wave number vector acquired by projecting the wave number vector of the first deflection means 41 onto the light guide plate 30 is denoted as $k^V_1$, the wave number vector acquired by projecting the wave number vector of the second deflection means 42 onto the light guide plate 30 is denoted as $k^V_2$, and the wave number vector acquired by projecting the wave number vector of the third deflection means 43 onto the light guide plate 30 is denoted as $k^V_3$, the summation of the wave number vectors $k^V_1$, $k^V_2$, and $k^V_3$ is zero. More specifically, when the component of $k^V_1$ in the direction of the $X_{in}$ axis is denoted as $k_{1\text{-}X}$, the component of $k^V_1$ in the direction of the $Y_{in}$ axis is denoted as $k_{1\text{-}Y}$, the component of $k^V_2$ in the direction of the $X_{in}$ axis is denoted as $k_{2\text{-}X}$, the component of $k^V_2$ in the direction of the $Y_{in}$ axis is denoted as $k_{2\text{-}Y}$, the component of $k^V_3$ in the direction of the $X_{in}$ axis is denoted as $k_{3\text{-}X}$, and the component of $k^V_3$ in the direction of the $Y_{in}$ axis is denoted as $k_{3\text{-}Y}$ with reference to the first and second coordinate systems, the following are noted.

$k_{1\text{-}X} + k_{2\text{-}X} + k_{3\text{-}X} = 0$ $k_{1\text{-}Y} + k_{2\text{-}Y} + k_{3\text{-}Y} = 0$ Also, when the diffraction efficiency of the first deflection means 41 for light emitted from the image forming apparatuses 50A, 50B, and 50C is denoted as $\eta_1$, the diffraction efficiency of the second deflection means 42 for light emitted from the image forming apparatuses 50A, 50B, and 50C is denoted as $\eta_2$, and the diffraction efficiency of the third deflection means 43 for light emitted from the image forming apparatuses 50A, 50B, and 50C is denoted as $\eta_3$, the following are satisfied.

$$\eta_2/\eta_1 < 1$$

$$\eta_3/\eta_1 < 1$$

The light guide plate 30 has two parallel surfaces (a first surface 31 and a second surface 32 opposed to the first surface 31). Then, the first surface 31 of the light guide plate 30 corresponds to the incident surface into which light enters and also corresponds to the emission surface of the light guide plate from which light is emitted. The first deflection means 41, the second deflection means 42, and the third deflection means 43 are provided on (specifically, bonded to) the second surface 32 of the light guide plate 30. The first deflection means 41, the second deflection means 42, and the third deflection means 43 each include a single diffraction grating layer. It should be noted that interference fringes corresponding to one wavelength band (or wavelength) are formed in each diffraction grating means that includes a photopolymer material and are formed by a method of the related art. The pitch of the interference fringes formed in the deflection means (diffraction optical elements) is constant, and the interference fringes are linear.

The first deflection means 41 diffracts and reflects light entering into the light guide plate 30, and the third deflection means 43 diffracts and reflects the light that has propagated in the light guide plate 30 by total reflection toward the second deflection means 42. The second deflection means 42 diffracts and reflects the light that has propagated in the light guide plate 30 by total reflection toward the pupil 20 of the observer. The propagation of light in the light guide plate 30 from the first deflection means 41 toward the third deflection means 43 by total reflection expands (enlarges) the image entering into the light guide plate 30 in the direction of the $Y_{in}$ axis. Also, the propagation of light in the light guide plate 30 from the third deflection means 43 toward the second deflection means 42 by total reflection expands the image that has already been expanded (enlarged) in the direction of the $Y_{in}$ axis further in the direction of the $X_{out}$ axis. The image entering into the light guide plate 30 from the image forming apparatuses 50A, 50B, and 50C is expanded (enlarged) vertically and horizontally and reaches the pupil 20 of the observer. Also, parallel light beams entering into the first surface 31 of the light guide plate 30 from the image forming apparatuses 50A, 50B, and 50C propagate in the light guide plate 30 by total reflection, are diffracted by the first deflection means 41, the second deflection means 42, and the third deflection means 43 (specifically, diffracted and reflected a plurality of times), and are emitted from the first surface 31 of the light guide plate 30 unchanged in the form of parallel light beams.

A structure may be used in which surfaces of the first deflection means 41, the second deflection means 42, and the third deflection means 43 not opposed to the light guide plate 30 are covered with transparent resin plates or transparent resin films to prevent damage to the first deflection means 41, the second deflection means 42, and the third deflection means 43. Also, a transparent protective film may be affixed to the first surface 31 of the light guide plate 30 to protect the light guide plate 30.

In the example illustrated, the first deflection means 41, the second deflection means 42, and the third deflection means 43 are rectangular in planar shape. The light guide plate 30 is also rectangular in planar shape. It should be noted, however, that the planar shape of these members is not limited to being rectangular. As illustrated in schematic plan views of the first deflection means 41, the second deflection means 42, the third deflection means 43, and the light guide plate 30 in FIGS. 10A, 10B, and 10C, the first deflection means 41 may be circular in planar shape, and the third deflection means 43 may be trapezoidal in planar shape. The planar shape of the light guide plate 30 can have notched corners. Here, all light deflected by the first deflection means 41 (excluding light lost in the light guide plate 30) enters into the third deflection means 43, and all light deflected by the third deflection means 43 (excluding light lost in the light guide plate 30) enters into the second deflection means 42.

A wavelength $\lambda 0$ of (monochromatic) light emitted from the image forming apparatuses 50A, 50B, and 50C was set to 530 nm. Also, the material included in the light guide plate 30 was set to glass of 1.0 mm in thickness (refractive index of 1.51), and the average refractive index of the photopolymer material included in the first deflection means 41, the second deflection means 42, and the third deflection means 43 was set to 1.51. It should be noted that although the thickness of the light guide plate 30 does not essentially contribute to increasing the view angle of the display image, it is possible to downsize the first deflection means 41 by reducing the thickness of the light guide plate 30. As a result, the parallel light beam emission optics included in the image forming apparatuses 50A, 50B, and 50C can be downsized, and the number of times light is totally reflected in the light guide plate 30 can be reduced by increasing the thickness of the light guide plate 30, and high quality images can be projected with minimal reflection surface scattering. Therefore, the light guide plate 30 with an optimal thickness needs to be selected.

Here, the rectangle formed by the wave number vectors $k^V_1$, $k^V_2$, and $k^V_3$ is a right isosceles triangle in the example illustrated in FIGS. 8A and 8B and that values of grating periods $d_1$ and $d_2$ of the first deflection means 41 and the second deflection means 42 are 422 nm and a value of a grating period $d_3$ of the third deflection means 43 is 422 nm/$2^{1/2}$=298 nm.

FIG. 12 illustrates, as a comparative example 1A, simulation results of a view angle (depicted by a black dot) that can be extracted as outgoing light and an image display region (depicted by a rectangular region) in a case where the point A is located on the $-Z_{in}$ axis (i.e., in a case where the point A is at the coordinates (0,0,0) in the first coordinate system). Also, FIG. 11 illustrates, as the working example 1A, simulation results of the view angle (depicted by a black dot) that can be extracted as outgoing light and the image display region (depicted by a rectangular region) in the case of the (case E), that is, in a case where the point A is at the coordinates $(x_{in}, 0, -z_{in})$ (where $x_{in} > 0$, $z_{in} > 0$) in the first coordinate system. It should be noted as follows.

$$\tan^{-1}=(|x^V_{in-out}|/|y^V_{in-out}|)=180 \text{ degrees}$$

$$\cos^{-1}=|z^V_{in-out}|=177 \text{ degrees}$$

It is clear from FIG. 11 (working example 1A) and FIG. 12 (comparative example 1A) that the working example 1A allows the view angle to be increased more than the comparative example 1A. Also, an image with a wide view angle can be projected by selecting an image display region in a horizontally and vertically symmetric manner about the second origin $O_{out}$ as an image center.

Simulations of the working example 1B and a comparative example 1B were conducted with the refractive index of the material included in the light guide plate 30 set to 1.60 and the average refractive index of the photopolymer material included in the first deflection means 41, the second deflection means 42, and the third deflection means 43 set to 1.60. FIG. 14 illustrates, as the comparative example 1B, simulation results of the view angle (depicted by a black dot) that can be extracted as outgoing light and the image display region (depicted by a rectangular region) in a case where the point A is located on the $-Z_{in}$ axis (i.e., in a case where the point A is at the coordinates (0,0,0) in the first coordinate system). Also, FIG. 13 illustrates, as the working example 1B, simulation results of the view angle (depicted by a black dot) that can be extracted as outgoing light and the image display region (depicted by a rectangular region) in the case of the (case B), that is, in a case where the point A is in the sixth quadrant of the first coordinate system. It should be noted as follows.

$$\tan^{-1}=(|x^V_{in-out}|/|y^V_{in-out}|)=135 \text{ degrees}$$

$$\cos^{-1}=|z^V_{in-out}|=177 \text{ degrees}$$

It is clear from FIG. 12 (comparative example 1A) and FIG. 14 (comparative example 1B) that the comparative example 1B depicting a configuration with materials having high refractive index allows the view angle to be increased more than comparative example 1A, and it is also clear from FIG. 13 (working example 1B) and FIG. 14 (comparative example 1B) that working example 1B allows the view angle to be increased more than the comparative example 1B. Also, an image with a wide view angle can be projected by selecting an image display region in a horizontally and vertically symmetric manner about the second origin $O_{out}$ as an image center.

It has been found from the above results and further from various simulation results that it is desirable that the refractive index of the material included in the light guide plate 30 be 1.5 or more, and preferably, 1.6 or more, and that it is desirable that the refractive index of the material included in the volume holographic diffraction grating of the first deflection means 41, the second deflection means 42, and the third deflection means 43 be 1.5 or more, and preferably, 1.6 or more.

As illustrated in FIG. 4, the image forming apparatus 50A is an image forming apparatus of a first configuration having a plurality of pixels arranged in a two-dimensional matrix pattern. Specifically, the image forming apparatus 50A includes a reflective spatial light modulator and a light source 51. The light source 51 includes a light-emitting diode that emits white light. Each of the image forming apparatuses 50A as a whole is accommodated in a housing 60 (depicted by a long dashed short dashed line in FIG. 4), and the housing 60 has an opening portion (not depicted). Light is emitted from an optics (parallel light beam emission optics or collimating optics) 59 via the opening portion. The housing 60 is detachably attached to a temple portion 13 with an attachment member 19. The reflective spatial light modulator includes a liquid crystal display apparatus (LCD) 53 that includes LCOS as light bulb. Further, the image forming apparatus 50A includes a polarization beam splitter 52 that reflects part of light from the light source 51 and guides the light to the liquid crystal display apparatus 53 and, at the same time, allows part of light reflected by the liquid crystal display apparatus 53 to pass and guides the light to the optics 59. The liquid crystal display apparatus 53 includes a plurality of (e.g., 640 by 480) pixels (liquid crystal cells) that are arranged in a two-dimensional matrix pattern. The polarization beam splitter 52 has a known configuration and structure. Unpolarized light emitted from the light source 51 strikes the polarization beam splitter 52. A p-polarization component passes through the polarization beam splitter 52 and is emitted therefrom. On the other hand, an s-polarization component is reflected by the polarization beam splitter 52 and enters into the liquid crystal display apparatus 53. The s-polarization component is reflected in the liquid crystal display apparatus 53 and is emitted therefrom. Here, of the light emitted from the liquid crystal display apparatus 53, the light emitted from the pixels displaying "white" include a high proportion of the p-polarization component, and the light emitted from the pixels displaying "black" include a high proportion of the s-polarization component. Therefore, of the light emitted from the liquid crystal display apparatus 53 and striking the polarization beam splitter 52, the p-polarization component passes through the polarization beam splitter 52 and is guided into the optics 59. On the other hand, the s-polarization component is reflected by the polarization beam splitter 52 and returns to the light source 51. The optics 59 includes, for example, a convex lens, and the image forming apparatus 50A (more specifically, the liquid crystal display apparatus 53) is provided at a focal distance location (position) of the optics 59.

Alternatively, as illustrated in FIG. 5, the image forming apparatus 50B includes an organic EL display apparatus 54. An image emitted from the organic EL display apparatus 54 passes through the convex lens 59, is transformed into parallel light beams, and proceeds toward the light guide plate 30. The organic EL display apparatus 54 includes a plurality of (e.g., 640 by 480) pixels (organic EL elements) that are arranged in a two-dimensional matrix pattern.

Alternatively, as illustrated in FIG. 6, the image forming apparatus 50C, an image forming apparatus of a second configuration, includes a light source 55, a collimating optics 56, scanning means 58, and a relay optics 59. The collimating optics 56 transforms light emitted from the light source 55 into parallel light beams. The scanning means 58 scans the light beams emitted from the collimating optics 56. The relay optics 59 relays the parallel light beams scanned by the scanning means and emits the parallel light beams. It should be noted that the image forming apparatus 50C as a whole is accommodated in the housing 60 (depicted by a long dashed short dashed line in FIG. 6), and the housing 60 has an opening portion (not depicted). Light is emitted from the optics 59 via the opening portion. Then, the housing 60 is detachably attached to the temple portion 13 with the attachment member 19. The light source 55 includes a light-emitting element that produces white light. Then, light emitted from the light source 55 enters into the collimating optics 56 having, as a whole, positive optical power and is emitted as parallel light beams. Then, these parallel light beams are reflected by a total reflection mirror 57, horizontally and vertically scanned by the scanning means 58 that includes MEMS with a two-dimensionally rotatable micromirror to two-dimensionally scanning incident light, and is transformed into a kind of two-dimensional image, thus generating virtual pixels (the number of which can be, for example, the same as in working example 1). Then, light from the virtual pixels passes through the relay optics (parallel light beam emission optics) 59 that includes a known relay optics, and a luminous flux in the form of parallel light beams enters into the optical apparatus 22.

The frame 10 includes a front portion 11 (including a rim 11') provided in front of the observer, two temple portions 13, and temple tip portions (also referred to as ear pads) 14. The temple portions 13 are rotatably attached to both ends of the front portion 11 via hinges 12. The temple tip portions 14 are each attached to an edge of one of the temple portions 13. Also, a nose pad (not depicted) is attached. That is, an assembly of the frame 10 and the nose pad basically has substantially the same structure as ordinary glasses. Further, as described earlier, each of the housings 60 is detachably attached to the temple portion 13 by the attachment member 19. The frame 10 includes a metal or plastic. It should be noted that each of the housings 60 may be attached to the temple portion 13 by the attachment member 19 in an undetachable manner. Also, although depicted as attached to the inside of the temple portion 13, each of the housings 60 may be attached to the outside of the temple portion 13.

Further, wiring (e.g., signal line, power line) 15 extending from one of the image forming apparatuses 50A, 50B, and 50C extends externally from an edge of the temple tip portion 14 via the temple portion 13 and the inside of the temple tip portion 14 and is connected to a control apparatus (control circuit or control means) 18. Further, each of the image forming apparatuses 50A, 50B, and 50C includes a headphone section 16. Headphone section wiring 17 extending from each of the image forming apparatuses 50A, 50B, and 50C extends from the edge of the temple tip portion 14 to the headphone section 16 via the temple portion 13 and the inside of the temple tip portion 14. The headphone section wiring 17, more specifically, extends to the headphone section 16 in such a manner as to get around the back side of an auricle (ear shell) from the edge of the temple tip portion 14. Such a configuration prevents one from having an impression that the headphone sections 16 and the headphone section wiring 17 are arranged in a disordered manner, thus providing an uncluttered display apparatus.

In the optical apparatus of the working example 1, the central outgoing light beam intersects the $X_{out}Y_{out}$ plane and/or the $X_{out}Z_{out}$ plane at a given angle. This makes it possible to further expand a display image, emitted from the light guide plate, vertically and horizontally about the $-Z_{out}$ axis of the second coordinate system, thus allowing for the view angle of the display image to be further increased.

While the present disclosure has been described above on the basis of a preferred working example, the present disclosure is not limited to the working example. The configurations and structures of the display apparatuses (head-mounted displays), the image display apparatuses, and the optical apparatuses described in the working example are illustrative and can be changed as appropriate. In the optical apparatuses, the first deflection means, the second deflection means, and the third deflection means can each include a transmissive volume holographic diffraction grating. Alternatively, reflective and transmissive volume holographic diffraction gratings can be used in a mixed manner (in combination). Alternatively, reflective blazed diffraction grating elements may be used as the deflection means. The display apparatus of the present disclosure can be used as a stereoscopic display apparatus. In this case, it is only necessary to detachably attach a polarizing plate or polarizing film to the optical apparatus or affix a polarizing plate or polarizing film to the optical apparatus as necessary.

In order to ensure that the central outgoing light beam intersects the $X_{out}Y_{out}$ plane and/or the $X_{out}Z_{out}$ plane at a given angle, it is only necessary to arrange the image forming apparatus and the optical apparatus in such a manner that the center point of the image forming region of the image forming apparatus is located on the $\pm Z_{in}$ axis. Alternatively, for example, in order to move the image in the direction of the $Y_{in}$ axis, the control apparatus may generate two signals, one used as a display position correction signal for changing the image position based on an image signal by plus or minus i pixels along the $Y_{in}$ axis, and another used as a display position correction signal for changing the image position based on the image signal by plus or minus j pixels along the $X_{in}$ axis. In these cases, the center point of the image forming region of the image forming apparatus is misaligned from a physical center point of the image forming region by plus or minus i or j pixels.

Also, the image display apparatus described in the working example 1 can be modified as described below. That is, as illustrated in a schematic diagram as viewed from above in FIG. 15, light-shielding members 70 can be provided in the regions opposed to the regions of the optical apparatus 22 into which light emitted from the image forming apparatuses 50A, 50B, and 50C enters (more specifically, the regions of the light guide plate 30 where the first deflection means 41 is disposed). Specifically, for example, it is only necessary to arrange the light-shielding members 70 on the side opposite to the side where the image forming apparatuses 50A, 50B, and 50C of the optical apparatus 22 are provided and arrange the light-shielding members 70 at a distance from the optical apparatus 22.

While the image forming apparatuses 50A, 50B, and 50C displayed monochromatic (e.g., green) images in the description given in the working example, the image forming apparatuses 50A, 50B, and 50C can also display color images. In this case, the light sources need only include, for example, light sources that emit red, green, and blue. Specifically, it is only necessary to acquire white light by mixing red, green, and blue light emitted from the red, green, and blue light-emitting elements and evening out the luminance thereof with light pipes. Then, as illustrated in the conceptual diagram of the optical apparatus of FIG. 16A, a structure may be employed in which first deflection means 41R, third deflection means 43R, and second deflection means 42R, each including a diffraction grating layer that includes a volume holographic diffraction grating for diffracting and reflecting light having a red wavelength band (or wavelength), are disposed on a first light guide plate, in which first deflection means 41G, third deflection means 43G, and second deflection means 42G, each including a diffraction grating layer that includes a volume holographic diffraction grating for diffracting light having a green wavelength band (or wavelength), are disposed on a second light guide plate, in which first deflection means 41B, third deflection means 43B, and second deflection means 42B, each including a diffraction grating layer that includes a volume holographic diffraction grating for diffracting light having a blue wavelength band (or wavelength), are disposed on a third light guide plate, and in which the first light guide plate, the second light guide plate, and the third light guide plate are stacked one on top of the other with a space therebetween. Alternatively, as illustrated in the conceptual diagram of the optical apparatus of FIG. 16B, a structure may be employed in which the first deflection means 41R, the third deflection means 43R, and the second deflection means 42R, each including a diffraction grating layer that includes a volume holographic diffraction grating for diffracting and reflecting light having a red wavelength band (or wavelength), are disposed on one side of a first light guide plate, in which the first deflection means 41G, the third deflection means 43G, and the second deflection means 42G, each including a diffraction grating layer that includes a volume holographic diffraction grating for diffracting light having a green wavelength band (or wavelength), are disposed on other side of the first light guide plate, in which the first deflection means 41B, the third deflection means 43B, and the second deflection means 42B, each including a diffraction grating layer that includes a volume holographic diffraction grating for diffracting light having a blue wavelength band (or wavelength), are disposed on a second light guide plate, and in which the first light guide plate and the second light guide plate are stacked one on top of the other with a space therebetween. Alternatively, as illustrated in the conceptual diagram of the optical apparatus of FIG. 16C, a structure may be employed in which the first deflection means 41G, the third deflection means 43G, and the second deflection means 42G, each including a diffraction grating layer that includes a volume holographic diffraction grating for diffracting light having a green wavelength band (or wavelength) are disposed on one side of a first light guide plate, and on top of these deflection means, the first deflection means 41R, the third deflection means 43R, and the second deflection means 42R, each including a diffraction grating layer that includes a volume holographic diffraction grating for diffracting and reflecting light having a red wavelength band (or wavelength) are stacked further, and in which the first deflection means 41B, the third deflection means 43B, and the second deflection means 42B, each including a diffraction grating layer that includes a volume holographic diffraction grating for diffracting light having a blue wavelength band (or wavelength), are disposed on other side of the first light guide plate.

Alternatively, the optical apparatus can be modified as described below with reference to FIGS. 17A, 17B, 17C, 17D, 17E, 17F, 17G, and 17H depicting conceptual diagrams of modification examples of the optical apparatus described in working example 1. That is, as illustrated in FIG. 17A, first deflection means 41a including a transmissive volume holographic diffraction grating may be provided on the first surface of the light guide plate, and second deflection means 42b and third deflection means 43b each including a reflective volume holographic diffraction grating may be provided on the second surface of the light guide plate. Alternatively, as illustrated in FIG. 17B, second deflection means 42a and third deflection means 43a each including a transmissive volume holographic diffraction grating may be provided on the first surface of the light guide plate, and first deflection means 41b including a reflective volume holographic diffraction grating may be provided on the second surface of the light guide plate. Alternatively, as illustrated in FIG. 17C, the first deflection means 41a, the second deflection means 42a, and the third deflection means 43a each including a transmissive volume holographic diffraction grating may be provided on the first surface of the light guide plate. Alternatively, as illustrated in FIG. 17D, the first deflection means 41a including a transmissive volume holographic diffraction grating may be provided on the first surface of the light guide plate, and the first deflection means 41b, the second deflection means 42b, and the third deflection means 43b each including a reflective volume holographic diffraction grating may be provided on the second surface of the light guide plate. Alternatively, as illustrated in FIG. 17E, the first deflection means 41a, the second deflection means 42a, and the third deflection means 43a each including a transmissive volume holographic diffraction grating may be provided on the first surface of the light guide plate, and the first deflection means 41b including a reflective volume holographic diffraction grating may be provided on the second surface of the light guide plate. Alternatively, as illustrated in FIG. 17F, the second deflection means 42a and the third deflection means 43a each including a transmissive volume holographic diffraction grating may be provided on the first surface of the light guide plate, and the first deflection means 41b, the second deflection means 42b, and the third deflection means 43b each including a reflective volume holographic diffraction grating may be provided on the second surface of the light guide plate. Alternatively, as illustrated in FIG. 17G, the first deflection means 41a, the second deflection means 42a, and the third deflection means 43a each including a transmissive volume holographic diffraction grating may be provided on the first surface of the light guide plate, and the second deflection means 42b and the third deflection means 43b each including a reflective volume holographic diffraction grating may be provided on the second surface of the light guide plate. Alternatively, as illustrated in FIG. 17H, the first deflection means 41a, the second deflection means 42a, and the third deflection means 43a each including a transmissive volume holographic diffraction grating may be provided on the first surface of the light guide plate, and the first deflection means 41b, the second deflection means 42b, and the third deflection means 43b each including a reflective volume holographic diffraction grating may be provided on the second surface of the light guide plate.

It should be noted that the present disclosure can have the following configurations.

[A01]<<Optical Apparatus: First Embodiment>>

An optical apparatus into which light emitted from an image forming apparatus enters, in which the light is guided, and from which the light is emitted, the optical apparatus including:

a light guide plate in which the incident light propagates by total reflection and from which the incident light is emitted;

first deflection means adapted to deflect the light entering into the light guide plate in such a manner that the light is totally reflected in the light guide plate;

second deflection means adapted to deflect the light that has propagated in the light guide plate by total reflection in such a manner as to cause the light to be emitted from the light guide plate; and third deflection means adapted to deflect the light that has been deflected by the first deflection means and that has propagated in the light guide plate by total reflection toward the second deflection means, in which when first coordinate system is assumed, in the first coordinate system, a point where a normal line of the light guide plate passing through a center point of the first deflection means intersects the light guide plate is denoted as a first origin $O_{in}$, a normal line of the light guide plate passing through the first origin $O_{in}$ and extending toward a side where light is emitted from the light guide plate is denoted as a $-Z_{in}$ axis, and an axis parallel to a traveling direction of the light that is deflected by the first deflection means and propagates in the light guide plate by total reflection and passing through the first origin $O_{in}$ is denoted as a $+Y_{in}$ axis, and when second coordinate system is assumed, in the second coordinate system, a point where a central incident light beam, a light beam emitted from the center point of an image forming region of the image forming apparatus and passing through the first origin $O_{in}$, is emitted from the light guide plate, is denoted as a second origin $O_{out}$, a normal line of the light guide plate passing through the second origin $O_{out}$ and extending toward the side where light is emitted from the light guide plate is denoted as a $-Z_{out}$ axis, and an axis parallel to the $+Y_{in}$ axis and passing through the second origin $O_{out}$ is denoted as a $+Y_{out}$ axis, a central outgoing light beam that includes a light beam at the time of emission of the central incident light beam from the light guide plate, intersects an $X_{out}Y_{out}$ plane at an angle different from zero degrees, or intersects an $X_{out}Z_{out}$ plane at an angle different from zero degrees, or intersects the $X_{out}Y_{out}$ plane at an angle different from zero degrees and intersects the $X_{out}Z_{out}$ plane at an angle different from zero degrees.

[A02]

The optical apparatus of feature [A01], in which
when, in the first and second coordinate systems,
a quadrant where X>0, Y>0, and Z>0 is defined as a first quadrant,
a quadrant where X<0, Y>0, and Z>0 is defined as a second quadrant,
a quadrant where X<0, Y<0, and Z>0 is defined as a third quadrant,
a quadrant where X>0, Y<0, and Z>0 is defined as a fourth quadrant,
a quadrant where X>0, Y>0, and Z<0 is defined as a fifth quadrant,
a quadrant where X<0, Y>0, and Z<0 is defined as a sixth quadrant,
a quadrant where X<0, Y<0, and Z<0 is defined as a seventh quadrant, and
a quadrant where X>0, Y<0, and Z<0 is defined as an eighth quadrant, and
when a point where the center point of the image forming region in the first coordinate system is located is denoted as a point A and the point in the second coordinate system toward which the central outgoing light beam proceeds is denoted as point B,
the points A and B satisfy any one of the following (case A), (case B), (case C), (case D), (case E), or (case F):
(case A) in a case where the point A is located in the first or fifth quadrant of the first coordinate system, the point B is located in the seventh quadrant of the second coordinate system,
(case B) in a case where the point A is located in the second or sixth quadrant of the first coordinate system, the point B is located in the eighth quadrant of the second coordinate system,
(case C) in a case where the point A is located in the third or seventh quadrant of the first coordinate system, the point B is located in the fifth quadrant of the second coordinate system,
(case D) in a case where the point A is located in the fourth or eighth quadrant of the first coordinate system, the point B is located in the sixth quadrant of the second coordinate system,
(case E) in a case where coordinates of the point A are a coordinates $(x_{in}, 0, -z_{in})$ or coordinates $(x_{in}, 0, z_{in})$ in the first coordinate system, the coordinates of the point B are coordinates $(-x_{out}, 0, -z_{out})$ in the second coordinate system, and
(case F) in a case where the coordinates of the point A are coordinates $(0, y_{in}, -z_{in})$ or coordinates $(0, y_{in}, z_{in})$ in the first coordinate system, the coordinates of the point B are coordinates $(0, -y_{out}, -z_{out})$ in the second coordinate system,
$x_{in}$, $y_{in}$, $z_{in}$, $x_{out}$, $y_{out}$, and $z_{out}$ described above satisfy $x_{in} \neq 0$, $y_{in} \neq 0$, $z_{in} > 0$, $x_{out} \neq 0$, $y_{out} \neq 0$, and $z_{out} > 0$.

[A03]

The optical apparatus of feature [A02], in which
any one of the (case A), (case B), (case D), (case E), or (case F) is satisfied.

[A04]

The optical apparatus of any one of features [A01] to [A03], in which an absolute value of an incident angle of the central incident light beam in the first coordinate system and an absolute value of an outgoing angle of the central outgoing light beam in the second coordinate system are equal.

[A05]<<Optical Apparatus: Second Embodiment>>

An optical apparatus into which light emitted from an image forming apparatus enters, in which the light is guided, and from which the light is emitted, the optical apparatus including:
a light guide plate in which the incident light propagates by total reflection and from which the incident light is emitted;
first deflection means adapted to deflect the light entering into the light guide plate in such a manner that the light is totally reflected in the light guide plate;
second deflection means adapted to deflect the light that has propagated in the light guide plate by total reflection in such a manner as to cause the light to be emitted from the light guide plate; and
third deflection means adapted to deflect the light that has been deflected by the first deflection means and that has propagated in the light guide plate by total reflection toward the second deflection means, in which
an incident angle of a central incident light beam that includes a light beam emitted from a center point of an image forming region of the image forming apparatus on the light guide plate, is an angle other than zero degrees, and a unit vector of the central incident light beam and a unit vector of a central outgoing light beam that includes a light beam at a time of emission of the central incident light beam from the light guide plate, are identical in magnitude.

[A06]

The optical apparatus of any one of features [A01] to [A05], in which
at least one of the first deflection means, the second deflection means, or the third deflection means includes a volume holographic diffraction grating.

[A07]

The optical apparatus of any one of features [A01] to [A06], in which
each of the first deflection means, the second deflection means, and the third deflection means includes a volume holographic diffraction grating, and
when a wave number vector acquired by projecting the wave number vector of the first deflection means onto the light guide plate is denoted as $k^V_1$, a wave number vector acquired by projecting the wave number vector of the second deflection means onto the light guide plate is denoted as $k^V_2$, and a wave number vector acquired by projecting the wave number vector of the third deflection means onto the light guide plate is denoted as $k^V_3$, a summation of the wave number vectors $k^V_1$, $k^V_2$, and $k^V_3$ is zero.

[A08]

The optical apparatus of any one of features [A01] to [A07], in which
each of the first deflection means, the second deflection means, and the third deflection means includes a volume holographic diffraction grating, and
when a diffraction efficiency of the first deflection means for light emitted from the image forming apparatus is denoted as $\eta_1$, a diffraction efficiency of the second deflection means for light emitted from the image forming apparatus is denoted as $\eta_2$, and a diffraction efficiency of the third deflection means for light emitted from the image forming apparatus is denoted as $\eta_3$, the following are satisfied.

$\eta_2/\eta_1 < 1$ $\eta_3/\eta_1 < 1$

[A09]
The optical apparatus of any one of features [A01] to [A08], in which
all light deflected by the first deflection means enters into the third deflection means, and
all light deflected by the third deflection means enters into the second deflection means.

[A10]
The optical apparatus of any one of features [A01] to [A09], in which
a refractive index of a material included in the light guide plate is 1.5 or more, and preferably 1.6 or more.

[A11]
The optical apparatus of any one of features [A01] to [A10], in which
each of the first deflection means, the second deflection means, and the third deflection means includes a volume holographic diffraction grating, and
the refractive index of a material included in the volume holographic diffraction grating is 1.5 or more, and preferably 1.6 or more.

[B01]<<Image Display Apparatus: First Embodiment>>
An image display apparatus including:
an image forming apparatus; and
an optical apparatus into which light emitted from an image forming apparatus enters, in which the light is guided, and from which the light is emitted,
the optical apparatus includes
a light guide plate in which the incident light propagates by total reflection and from which the incident light is emitted,
first deflection means adapted to deflect the light entering into the light guide plate in such a manner that the light is totally reflected in the light guide plate,
second deflection means adapted to deflect the light that has propagated in the light guide plate by total reflection in such a manner as to cause the light to be emitted from the light guide plate, and
third deflection means adapted to deflect the light that has been deflected by the first deflection means and that has propagated in the light guide plate by total reflection toward the second deflection means, in which
when first coordinate system is assumed, in the first coordinate system, a point where a normal line of the light guide plate passing through a center point of the first deflection means intersects the light guide plate is denoted as a first origin $O_{in}$, a normal line of the light guide plate passing through the first origin $O_{in}$ and extending toward a side where light is emitted from the light guide plate is denoted as a $-Z_{in}$ axis, and an axis parallel to a traveling direction of the light that is deflected by the first deflection means and propagates in the light guide plate by total reflection and passing through the first origin $O_{in}$ is denoted as a $+Y_{in}$ axis, and when second coordinate system is assumed, in the second coordinate system, a point where a central incident light beam that includes a light beam emitted from the center point of an image forming region of the image forming apparatus and passing through the first origin $O_{in}$, is emitted from the light guide plate, is denoted as a second origin $O_{out}$, a normal line of the light guide plate passing through the second origin $O_{out}$ and extending toward the side where light is emitted from the light guide plate is denoted as a $-Z_{out}$ axis, and an axis parallel to the $+Y_{in}$ axis and passing through the second origin $O_{out}$ is denoted as a $+Y_{out}$ axis,
a central outgoing light beam that includes a light beam at the time of emission of the central incident light beam from the light guide plate, intersects an $X_{out}Y_{out}$ plane at an angle different from zero degrees, or intersects an $X_{out}Z_{out}$ plane at an angle different from zero degrees, or intersects the $X_{out}Y_{out}$ plane at an angle different from zero degrees and intersects the $X_{out}Z_{out}$ plane at an angle different from zero degrees.

[B02]<<Image Display Apparatus: Second Embodiment>>
An image display apparatus including:
an image forming apparatus; and
an optical apparatus into which light emitted from an image forming apparatus enters, in which the light is guided, and from which the light is emitted, in which
the optical apparatus includes the optical apparatus of any one of features [A01] to [A11].

[C01]<<Display Apparatus: First Embodiment>>
A display apparatus including:
a frame worn on an observer's head; and
an image display apparatus attached to the frame,
the image display apparatus includes
an image forming apparatus, and
an optical apparatus into which light emitted from the image forming apparatus enters, in which the light is guided, and from which the light is emitted,
the optical apparatus includes:
a light guide plate in which the incident light propagates by total reflection and from which the incident light is emitted,
first deflection means adapted to deflect the light entering into the light guide plate in such a manner that the light is totally reflected in the light guide plate,
second deflection means adapted to deflect the light that has propagated in the light guide plate by total reflection in such a manner as to cause the light to be emitted from the light guide plate, and
third deflection means adapted to deflect the light that has been deflected by the first deflection means and that has propagated in the light guide plate by total reflection toward the second deflection means, in which
when first coordinate system is assumed, in the first coordinate system, a point where a normal line of the light guide plate passing through a center point of the first deflection means intersects the light guide plate is denoted as a first origin $O_{in}$, a normal line of the light guide plate passing through the first origin $O_{in}$ and extending toward a side where light is emitted from the light guide plate is denoted as a $-Z_{in}$ axis, and an axis parallel to a traveling direction of the light that is deflected by the first deflection means and propagates in the light guide plate by total reflection and passing through the first origin $O_{in}$ is denoted as a $+Y_{in}$ axis, and
when second coordinate system is assumed, in the second coordinate system, a point where a central incident light beam that includes a light beam emitted from a center point of an image forming region of the image forming apparatus and passing through the first origin $O_{in}$, is emitted from the light guide plate, is denoted as a second origin $O_{out}$, a normal line of the light guide plate passing through the second origin $O_{out}$ and extending toward the side where light is emitted from the light guide plate is denoted as a $-Z_{out}$ axis, and an axis parallel to the $+Y_{in}$ axis and passing through the second origin $O_{out}$ is denoted as a $+Y_{out}$ axis, a central outgoing light beam that includes a light beam at the time of emission of the central incident light beam from the light guide plate, intersects an $X_{out}Y_{out}$ plane at an angle different from zero degrees, or intersects an $X_{out}Z_{out}$ plane at an angle different from zero degrees, or intersects the $X_{out}Y_{out}$ plane at an angle different from zero degrees and intersects the $X_{out}Z_{out}$ plane at an angle different from zero degrees.

[C02]<<Display Apparatus>>

A display apparatus including:
a frame worn on an observer's head; and
an image display apparatus attached to the frame,
the image display apparatus includes
an image forming apparatus, and
an optical apparatus into which light emitted from the image forming apparatus enters, in which the light is guided, and from which the light is emitted, in which
the optical apparatus includes the optical apparatus of any one of features [A01] to [A11].

[C03]

The display apparatus of feature [C01] or [C02], in which the frame includes:
a front portion provided in front of the observer;
two temple portions rotatably attached to both ends of the front portion via hinges; and
a nose pad, in which
the optical apparatus is provided on the front portion.

[C04]

The display apparatus of feature [C03], in which
the front portion includes a rim, and
the light guide plate is fitted in the rim.

REFERENCE SIGNS LIST

10 . . . Frame, 11 . . . Frame portion, 11' . . . Rim, 12 . . . Hinges, 13 . . . Temple portion, 14 . . . Temple tip portions, 15 . . . Wiring (e.g., signal line and power line), 16 . . . Headphone section, 17 . . . Headphone section wiring, 18 . . . Control apparatus (control circuit, control means), 19 . . . Attachment member, 20 . . . Pupil of the observer, 21 . . . Image display apparatus, 22 . . . Optical apparatus, 30 . . . Light guide plate, 31 . . . First surface of the light guide plate, 32 . . . Second surface of the light guide plate, 41, 41a, 41b . . . First deflection means, 42, 42a, 42b . . . Second deflection means, 43, 43a, 43b . . . Third deflection means, 50A, 50B, 50C . . . Image forming apparatuses, 51 . . . Light source, 52 . . . Polarization beam splitter (PBS), 53 . . . Liquid crystal display apparatus (LCD), 54 . . . Organic EL display apparatus, 55 . . . Light source, 56 . . . Collimating optics, 57 . . . Total reflection mirror, 58 . . . Scanning means, 59 . . . Optics (collimating optics), 60 . . . Housing, 70 . . . Light-shielding members

The invention claimed is:

1. An optical apparatus into which light emitted from an image forming apparatus enters, in which the light is guided, and from which the light is emitted, the optical apparatus comprising:
a light guide plate in which the light propagates by total reflection and from which the incident light is emitted;
first deflection means adapted to deflect the light entering into the light guide plate in such a manner that the light is totally reflected in the light guide plate;
second deflection means adapted to deflect the light that has propagated in the light guide plate by total reflection in such a manner as to cause the light to be emitted from the light guide plate; and
third deflection means adapted to deflect the light that has been deflected by the first deflection means and that has propagated in the light guide plate by total reflection toward the second deflection means, wherein
when first coordinate system is assumed, in the first coordinate system, a point where a normal line of the light guide plate passing through a center point of the first deflection means intersects the light guide plate is denoted as a first origin $O_{in}$, a normal line of the light guide plate passing through the first origin $O_{in}$ and extending toward a side where the light is emitted from the light guide plate is denoted as a $-Z_{in}$ axis, and an axis parallel to a traveling direction of the light that is deflected by the first deflection means and propagates in the light guide plate by total reflection and passing through the first origin $O_{in}$ is denoted as a $+Y_{in}$ axis, and
when second coordinate system is assumed, in the second coordinate system, a point where a central incident light beam, a light beam emitted from a center point of an image forming region of the image forming apparatus and passing through the first origin $O_{in}$ is emitted from the light guide plate is denoted as a second origin $O_{out}$, a normal line of the light guide plate passing through the second origin $O_{out}$ and extending toward the side where the light is emitted from the light guide plate is denoted as a $-Z_{out}$ axis, and an axis parallel to the $+Y_{in}$ axis and passing through the second origin $O_{out}$ is denoted as a $+Y_{out}$ axis,
a central outgoing light beam that includes a light beam at a time of emission of the central incident light beam from the light guide plate, intersects an $X_{out} Y_{out}$ plane at an angle different from zero degrees, or intersects an $X_{out} Z_{out}$ plane at an angle different from zero degrees, or intersects the $X_{out} Y_{out}$ plane at an angle different from zero degrees and intersects the $X_{out} Z_{out}$ plane at an angle different from zero degrees.

2. The optical apparatus according to claim 1, wherein when, in the first and second coordinate systems,
a quadrant where X>0, Y>0, and Z>0 is defined as a first quadrant,
a quadrant where X<0, Y>0, and Z>0 is defined as a second quadrant,
a quadrant where X<0, Y<0, and Z>0 is defined as a third quadrant,
a quadrant where X>0, Y<0, and Z>0 is defined as a fourth quadrant,
a quadrant where X>0, Y>0, and Z<0 is defined as a fifth quadrant,
a quadrant where X<0, Y>0, and Z<0 is defined as a sixth quadrant,
a quadrant where X<0, Y<0, and Z<0 is defined as a seventh quadrant, and
a quadrant where X>0, Y<0, and Z<0 is defined as an eighth quadrant, and
when a point where the center point of the image forming region in the first coordinate system is located is denoted as a point A and the point in the second coordinate system toward which the central outgoing light beam proceeds is denoted as point B,
the points A and B satisfy any one of the following (case A), (case B), (case C), (case D), (case E), or (case F):
(case A) in a case where the point A is located in the first or fifth quadrant of the first coordinate system, the point B is located in the seventh quadrant of the second coordinate system, (case B) in a case where the point A is located in the second or sixth quadrant of the first coordinate system, the point B is located in the eighth quadrant of the second coordinate system, (case C) in a case where the point A is located in the third or seventh quadrant of the first coordinate system, the point B is located in the fifth quadrant of the second coordinate system, (case D) in a case where the point A is located in the fourth or eighth quadrant of the first coordinate system, the point B is located in the sixth quadrant of the second coordinate system, (case E) in a case where coordinates of the point A are a coordinates $(x_{in}, 0, -Z_{in})$ or coordinates $(X_{in}, 0, Z_{in})$ in the first coordinate system, the coordinates of the point B are coordinates $(-x_{out}, 0, -Z_{out})$ in the second coordinate system, and (case F) in a case where the coordinates of the point A are coordinates $(0, y_{in}, -Z_{in})$ or coordinates $(0, y_{in}, Z_{in})$ in the first coordinate system, the coordinates of the point B are coordinates $(0, -y_{out}, -z_{out})$ in the second coordinate system, $X_{in}, y_{in}, Z_{in}, X_{out}, y_{out},$ and $z_{out}$ described above satisfy $X_{in} \neq 0, y_{in} \neq 0, Z_{in} > 0, x_{out} \neq 0, y_{out} \neq 0,$ and $z_{out} \geq 0$.

3. The optical apparatus according to claim 2, wherein any one of the (case A), (case B), (case D), (case E), or (case F) is satisfied.

4. The optical apparatus according to claim 1, wherein an absolute value of an incident angle of the central incident light beam in the first coordinate system and an absolute value of an outgoing angle of the central outgoing light beam in the second coordinate system are equal.

5. An optical apparatus into which light emitted from an image forming apparatus enters, in which the light is guided, and from which the light is emitted, the optical apparatus comprising:

a light guide plate in which the light propagates by total reflection and from which the incident light is emitted;

first deflection means adapted to deflect the light entering into the light guide plate in such a manner that the light is totally reflected in the light guide plate;

second deflection means adapted to deflect the light that has propagated in the light guide plate by total reflection in such a manner as to cause the light to be emitted from the light guide plate; and third deflection means adapted to deflect the light that has been deflected by the first deflection means and that has propagated in the light guide plate by total reflection toward the second deflection means, wherein an incident angle of a central incident light beam that includes a light beam emitted from a center point of an image forming region of the image forming apparatus on the light guide plate, is an angle other than zero degrees, and a unit vector of the central incident light beam and a unit vector of a central outgoing light beam that include a light beam at a time of emission of the central incident light beam from the light guide plate, are identical in magnitude.

6. The optical apparatus according to claim 1, wherein at least one of the first deflection means, the second deflection means, or the third deflection means includes a volume holographic diffraction grating.

7. The optical apparatus according to claim 1, wherein each of the first deflection means, the second deflection means, and the third deflection means includes a volume holographic diffraction grating, and when a wave number vector acquired by projecting the wave number vector of the first deflection means onto the light guide plate is denoted as $k^V_1$, a wave number vector acquired by projecting the wave number vector of the second deflection means onto the light guide plate is denoted as $k^V_2$, and a wave number vector acquired by projecting the wave number vector of the third deflection means onto the light guide plate is denoted as $k^V_3$, a summation of the wave number vectors $k^V_1, k^V_2,$ and $k^V_3$ is zero.

8. The optical apparatus according to claim 1, wherein each of the first deflection means, the second deflection means, and the third deflection means includes a volume holographic diffraction grating, and when a diffraction efficiency of the first deflection means for the light emitted from the image forming apparatus is denoted as $\eta_1$, a diffraction efficiency of the second deflection means for the light emitted from the image forming apparatus is denoted as $\eta_2$, and a diffraction efficiency of the third deflection means for the light emitted from the image forming apparatus is denoted as $\eta_3$, the following are satisfied.

$\eta_2/\eta_1 < 1$ $\eta_3/\eta_1 < 1$

9. The optical apparatus according to claim 1, wherein all light deflected by the first deflection means enters into the third deflection means, and all light deflected by the third deflection means enters into the second deflection means.

10. The optical apparatus according to claim 1, wherein a refractive index of a material included in the light guide plate is 1.5 or more.

11. The optical apparatus according to claim 1, wherein each of the first deflection means, the second deflection means, and the third deflection means includes a volume holographic diffraction grating, and the refractive index of a material included in the volume holographic diffraction grating is 1.5 or more.

12. An image display apparatus, comprising:

an image forming apparatus; and an optical apparatus into which light emitted from the image forming apparatus enters, in which the light is guided, and from which the light is emitted, the optical apparatus includes a light guide plate in which the light propagates by total reflection and from which the incident light is emitted, first deflection means adapted to deflect the light entering into the light guide plate in such a manner that the light is totally reflected in the light guide plate, second deflection means adapted to deflect the light that has propagated in the light guide plate by total reflection in such a manner as to cause the light to be emitted from the light guide plate, and third deflection means adapted to deflect the light that has been deflected by the first deflection means and that has propagated in the light guide plate by total reflection toward the second deflection means, wherein when first coordinate system is assumed, in the first coordinate system, a point where a normal line of the light guide plate passing through a center point of the first deflection means intersects the light guide plate is denoted as a first origin $O_{in}$, a normal line of the light guide plate passing through the first origin $O_{in}$ and extending toward a side where the light is emitted from the light guide plate is denoted as a $-Z_{in}$ axis, and an axis parallel to a traveling direction of the light that is deflected by the first deflection means and propagates in the light guide plate by total reflection and passing through the first origin $O_{in}$ is denoted as a $+Y_{in}$ axis, and when second coordinate system is assumed, in the second coordinate system, a point where a central incident light beam that includes a light beam emitted from the center point of an image forming region of the image forming apparatus and passing through the first origin $O_{in}$, is emitted from the light guide plate, is denoted as a second origin $O_{out}$, a normal line of the light guide plate passing through the second origin $O_{out}$ and extending toward the side where the light is emitted from the light guide plate is denoted as a $-Z_{out}$ axis, and an axis parallel to the $+Y_{in}$ axis and passing through the second origin $O_{out}$ is denoted as a $+Y_{out}$ axis, a central outgoing light beam that includes a light beam at a time of the emission of the central incident light beam from the light guide plate, intersects an $X_{out}Y_{out}$ plane at an angle different from zero degrees, or intersects an $X_{out}Z_{out}$ plane at an angle different from zero degrees, or intersects the $X_{out}Y_{out}$ plane at an angle different from zero degrees and intersects the $X_{out}Z_{out}$ plane at an angle different from zero degrees.

13. An image display apparatus, comprising:
an image forming apparatus; and
an optical apparatus into which light emitted from the image forming apparatus enters, in which the light is guided, and from which the light is emitted, wherein
the optical apparatus includes the optical apparatus according to claim 1.

14. A display apparatus, comprising:
a frame worn on an observer's head; and
an image display apparatus attached to the frame,
the image display apparatus includes:
  an image forming apparatus, and
  an optical apparatus into which light emitted from the image forming apparatus enters, in which the light is guided, and from which the light is emitted,
  the optical apparatus includes:
  a light guide plate in which the light propagates by total reflection and from which the incident light is emitted,
  first deflection means adapted to deflect the light entering into the light guide plate in such a manner that the light is totally reflected in the light guide plate,
  second deflection means adapted to deflect the light that has propagated in the light guide plate by total reflection in such a manner as to cause the light to be emitted from the light guide plate, and
  third deflection means adapted to deflect the light that has been deflected by the first deflection means and that has propagated in the light guide plate by total reflection toward the second deflection means, wherein when first coordinate system is assumed, in the first coordinate system, a point where a normal line of the light guide plate passing through a center point of the first deflection means intersects the light guide plate is denoted as a first origin $O_{in}$, a normal line of the light guide plate passing through the first origin $O_{in}$ and extending toward a side where the light is emitted from the light guide plate is denoted as a $-Z_{in}$ axis, and an axis parallel to a traveling direction of the light that is deflected by the first deflection means and propagates in the light guide plate by total reflection and passing through the first origin $O_{in}$ is denoted as a $+Y_{in}$ axis, and when second coordinate system is assumed, in the second coordinate system, a point where a central incident light beam that includes a light beam emitted from a center point of an image forming region of the image forming apparatus and passing through the first origin $O_{in}$, is emitted from the light guide plate, is denoted as a second origin $O_{out}$, a normal line of the light guide plate passing through the second origin $O_{out}$ and extending toward the side where the light is emitted from the light guide plate is denoted as a $-Z_{out}$ axis, and an axis parallel to the $+Y_{in}$ axis and passing through the second origin $O_{out}$ is denoted as a $+Y_{out}$ axis, a central outgoing light beam that includes a light beam at a time of the emission of the central incident light beam from the light guide plate, intersects an $X_{out}Y_{out}$ plane at an angle different from zero degrees, or intersects an $X_{out}Z_{out}$ plane at an angle different from zero degrees, or intersects the $X_{out}Y_{out}$ plane at an angle different from zero degrees and intersects the $X_{out}Z_{out}$ plane at an angle different from zero degrees.

15. A display apparatus, comprising:
a frame worn on an observer's head; and
an image display apparatus attached to the frame,
the image display apparatus includes:
  an image forming apparatus, and
  an optical apparatus into which light emitted from the image forming apparatus enters, in which the light is guided, and from which the light is emitted, wherein
the optical apparatus includes the optical apparatus according to claim 1.

* * * * *